United States Patent
Yamamoto et al.

(10) Patent No.: US 7,239,347 B2
(45) Date of Patent: Jul. 3, 2007

(54) IMAGE DISPLAY CONTROLLING METHOD, IMAGE DISPLAY CONTROLLING APPARATUS AND IMAGE DISPLAY CONTROLLING PROGRAM

(75) Inventors: Takashi Yamamoto, Yamato (JP); Tomoyuki Ohno, Zama (JP); Tomoyasu Yoshikawa, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 339 days.

(21) Appl. No.: 11/036,401

(22) Filed: Jan. 14, 2005

(65) Prior Publication Data

US 2005/0183038 A1  Aug. 18, 2005

(30) Foreign Application Priority Data

Jan. 14, 2004  (JP)  ............................. 2004-006905

(51) Int. Cl.
H04N 5/76  (2006.01)

(52) U.S. Cl. ................................................. 348/231.2

(58) Field of Classification Search ............. 348/231.2; 715/838, 790, 794
See application file for complete search history.

(56) References Cited

U.S. PATENT DOCUMENTS

| | | | |
|---|---|---|---|
| 5,241,656 A * | 8/1993 | Loucks et al. ............... | 715/794 |
| 6,054,989 A * | 4/2000 | Robertson et al. ........... | 715/848 |
| 6,466,237 B1 * | 10/2002 | Miyao et al. ................ | 715/838 |
| 7,065,710 B2 * | 6/2006 | Hayashi et al. .............. | 715/732 |
| 7,159,177 B2 * | 1/2007 | Billmaier et al. ............ | 715/720 |
| 2002/0033848 A1 * | 3/2002 | Sciammarella et al. ..... | 345/838 |
| 2002/0089518 A1 * | 7/2002 | Shigeta ....................... | 345/629 |
| 2002/0181784 A1 * | 12/2002 | Shiratani .................... | 382/218 |
| 2003/0074366 A1 | 4/2003 | Shibanuma et al. ......... | 707/102 |
| 2003/0113037 A1 * | 6/2003 | Yoda ........................... | 382/302 |
| 2005/0001933 A1 | 1/2005 | Yoshikawa et al. .......... | 348/564 |

FOREIGN PATENT DOCUMENTS

| | | |
|---|---|---|
| JP | 9-256130 A | 9/1997 |
| JP | 10-228469 A | 8/1998 |
| JP | 2000-138814 A | 5/2000 |
| JP | 2001-306375 A | 11/2001 |
| JP | 2003-122466 A | 4/2003 |

* cited by examiner

*Primary Examiner*—Vivek Srivastava
*Assistant Examiner*—James M. Hannett
(74) *Attorney, Agent, or Firm*—Fitzpatrick, Cella, Harper & Scinto

(57) ABSTRACT

An image display controlling apparatus comprises a memory means for storing an attention area information and a date and time information for each image data of a plurality of images to be displayed on an image display means, an evaluation means for evaluating the attention area information based on a standard date and time information and the date and time information and producing a protection area information for a protection area set within the attention area, and an adjusting means for listing and displaying the plurality of the images with a superimposition controlled based on the protection area information, the plurality of the images are listed and displayed.

6 Claims, 18 Drawing Sheets

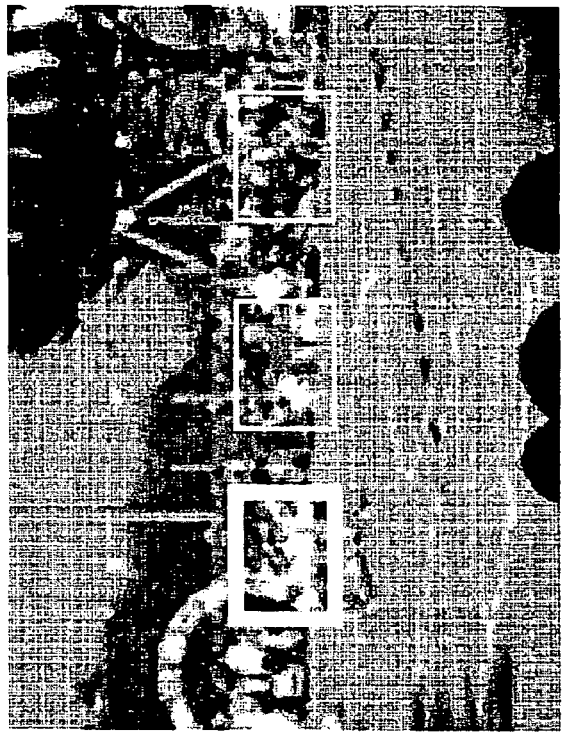
Fig. 3B  FOCUS POSITION: LEFT
Fig. 3A

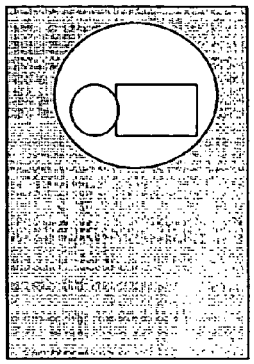
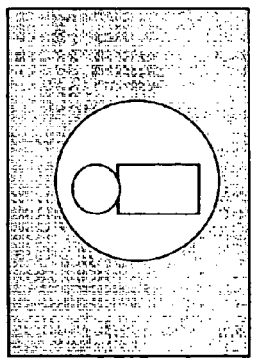
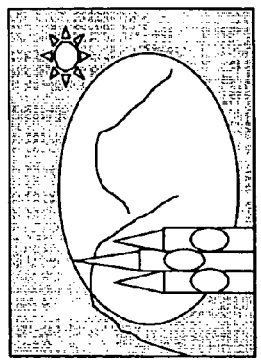
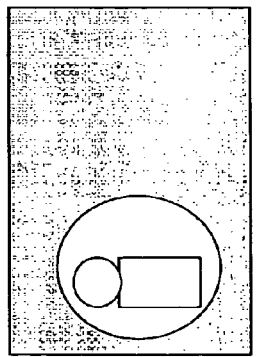
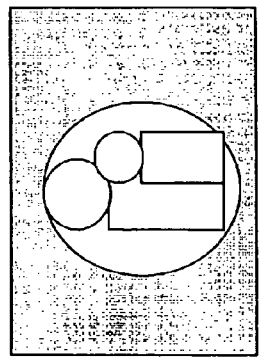
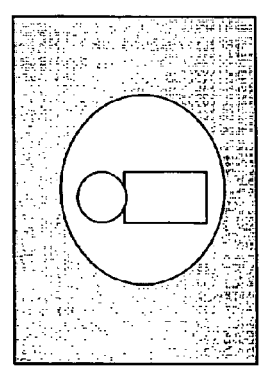
Fig. 5A  FOCUS: LEFT, FOCUS: CENTER, FOCUS: RIGHT
Fig. 5B  PERSONAL MODE, SCENERY MODE
Fig. 5C  AUTO MODE (FOCUS: NONE)

| PROBABILITY RANGE OF THE FACE RECOGNITION | ≧0.9 | ≧0.8 | ≧0.7 | ≧0.6 | ≧0.5 | ≧0.4 |
|---|---|---|---|---|---|---|
| ACCUMULATION AREA (PIXEL) | 1400 | 2100 | 4200 | 5900 | 6100 | 6200 |

*Fig.13*

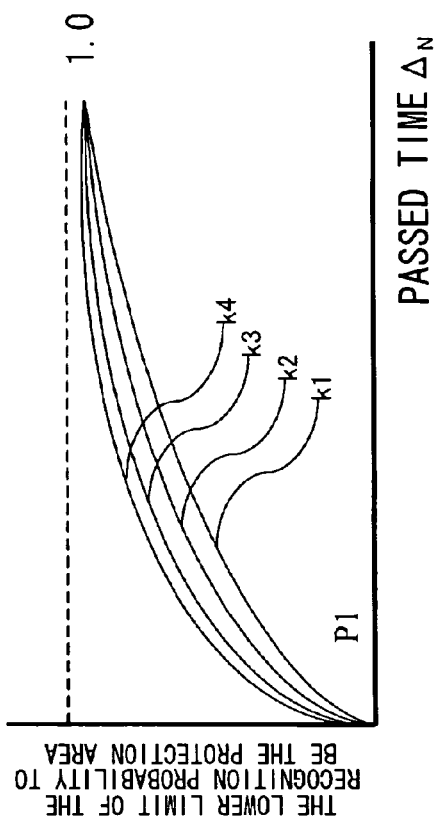
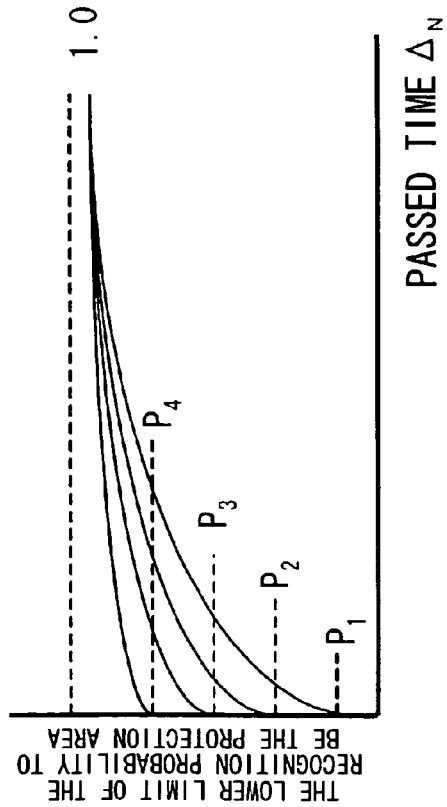
Fig. 16A
Fig. 16B

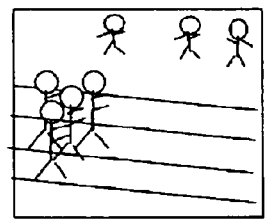 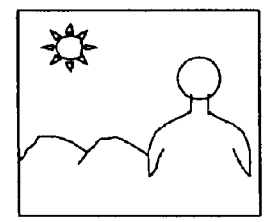
PHOTOGRAPH(a)   PHOTOGRAPH(b)
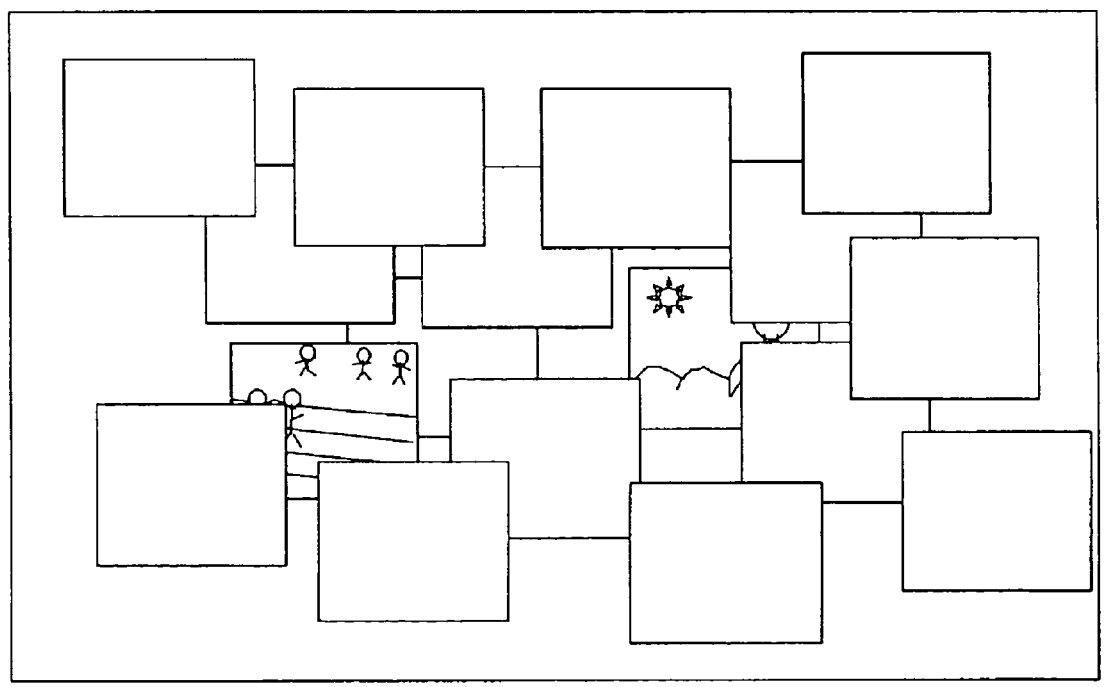
*Fig.18*

IMAGE DISPLAY CONTROLLING METHOD, IMAGE DISPLAY CONTROLLING APPARATUS AND IMAGE DISPLAY CONTROLLING PROGRAM

BACKGROUND OF THE INVENTION

1. Field of the Invention

The present invention relates to an image display controlling apparatus, an image display controlling method and an image display controlling program, which can be employed particularly preferably in a technique for displaying a plurality of image data easily viewable by a viewer in an apparatus for displaying and observing digital image data.

2. Description of the Relates Art

With the start of the digital high vision broadcast and spread of television receivers compatible to the high vision, dynamic and high quality video images can be enjoyed compared with the conventional ones. In contrast, according to the spread of electronic still cameras, more and more users enjoy electronic still images and video images displayed not only on a personal computer but also on a television monitor screen.

Then, in the case the user view a still image or a video image on the television receiver, in general, the user selects the data to be reproduced by viewing a list of thumbnails displayed on the monitor screen and selecting the thumbnail.

In contrast, recently, a memory with the memory capacity dramatically increased can be utilized, and thereby the number of the images to be stored is increased dramatically. For example, digital photographs of more than 500 pieces can be stored in a memory card. Therefore, it is not easy for a user to find out a desired image datum out of the image data of the large amount.

As a technique for arranging the image data of a large amount efficiently on a screen for facilitating the selection by the user himself, for example, the techniques disclosed in the patent document 1 (Unexamined Patent Publication No. 2001-306375) and the patent document 2 (Unexamined Patent Publication No. Hei 09-259130) can be presented. Among them, the patent document 1 discloses a technique for easily finding out desired data by moving thumbnail images while superimposing and displaying the same. Moreover, the patent document 2 discloses a technique for finding out desired data by displaying the image data in a three dimensional space (3D space) and moving the virtual view point.

However, according to the above-mentioned conventional techniques, since the thumbnail images are displayed while being superimposed, and thus the important portions for judging the photographs can be hidden.

Specifically, as shown in FIG. 18, for example, in the case the photograph (a) and the photograph (b) are present as the thumbnail images, the image of the "running" children on the left side of the image is the important portion in the photograph (a), and on the other hand, the person on the right side of the image in the photograph (b) is the important portion.

However, in the case these photographs are displayed with the other photographs while being superimposed, as shown in FIG. 18, they may be displayed with the important portions hidden. Therefore, according to the inventions displayed in the above-mentioned patent documents 1 and 2, a method of judging the photographs for viewing the important portions of the photographs by the operation of scrolling the displayed images or moving the virtual view point positions by the user had to be adopted.

SUMMARY OF THE INVENTION

Accordingly, an object of the present invention is to provide an image display controlling apparatus, an image display controlling method and an image display controlling program, capable of displaying a large number of image data while maintaining the state to be listed by the content intended by the photographer at the time of shooting, easily finding out the purposed image in the case of selecting a desired image by judging the displayed images, and searching and finding out a desired image easily by the user even in the state with a large number of digital images arranged efficiently on the screen.

In order to achieve the above-mentioned object, according to the present invention, in the case of displaying a plurality of images, at least attention area information set for each image and date and time information are stored, protection area information is produced by setting the protection area in the attention area according to the evaluation of the attention area information based on the standard date and time information and the image date and time information, and the plurality of the images are listed and displayed with the image superimposition controlled based on the produced protection area information.

That is, a first aspect of the present invention is an image display controlling apparatus comprising: a memory means for storing an attention area information and a date and time information for each image data of a plurality of images to be displayed on an image display means, an evaluation means for evaluating the attention area information based on a standard date and time information and the date and time information and producing a protection area information for a protection area set within the attention area, and an adjusting means for listing and displaying the plurality of the images with a superimposition controlled based on the protection area information, the plurality of the images are listed and displayed.

A second aspect of the present invention is an image display controlling method comprising: a step of storing the attention area information and the date and time information for each image data of a plurality of images data, a step of evaluating the attention area information based on the standard date and time information and the date and time information, a step of producing protection area information for a protection area set within the attention area, and a step of listing and displaying the plurality of the images with the superimposition of the display of the plurality of the images controlled based on the protection area information.

A third aspect of the present invention is an image display controlling program for having a display controlling means for controlling an image display means execute: a step of storing the attention area information and the date and time information for each image data of a plurality of images, a step of evaluating the attention area information based on the standard date and time information and the date and time information, a step of producing protection area information for a protection area set within the attention area, and a step of listing and displaying the plurality of the images with the superimposition of the display of the plurality of the images controlled based on the protection area information.

As heretofore explained, according to the present invention, since the protection area obtained by evaluating the attention area information set in the image data according to the date and time information of the image data and the standard date and time information is controlled so as to be displayed according to the superimposition with the other images at the time of displaying a large number of image data with a part of the image data display range superimposed with each other, a larger number of image data can be displayed while maintaining the state to be listed by the content intended by the photographer at the time of shooting so that a purposed image can be find out easily at the time of selecting a desired image by judging the displayed images.

BRIEF DESCRIPTION OF THE DRAWINGS

The invention, together with further advantages thereof, may best be understood by reference to the following description taken in conjunction with the accompanying drawings in which:

FIG. 3A is a diagram showing the liquid crystal display at the time of shooting by the digital camera according to the first embodiment of the present invention;

FIG. 3B is a diagram showing the liquid crystal display at the time of shooting by the digital camera according to the first embodiment of the present invention;

FIG. 5A is a schematic diagram for explaining the kinds of the attention area of the digital television according to the first embodiment of the present invention;

FIG. 5B is a schematic diagram for explaining the kinds of the attention area of the digital television according to the first embodiment of the present invention;

FIG. 5C is a schematic diagram for explaining the kinds of the attention area of the digital television according to the first embodiment of the present invention;

FIG. 13 is a table schematically showing an accumulation area table according to the second embodiment of the present invention;

FIG. 16A is a graph showing the function for evaluating the attention area in the display control process according to the second embodiment of the present invention;

FIG. 16B is a graph showing the function for evaluating the attention area in the display control process according to the second embodiment of the present invention;

FIG. 18 is a schematic diagram showing the display state of the images according to the conventional technique.

DESCRIPTION OF THE PREFERRED EMBODIMENTS

Hereinafter, the embodiments of the present invention will be explained with reference to the drawings. The same numerals are applied to the same or corresponding parts in the all drawings in the following embodiments.

First Embodiment

Figure 1:
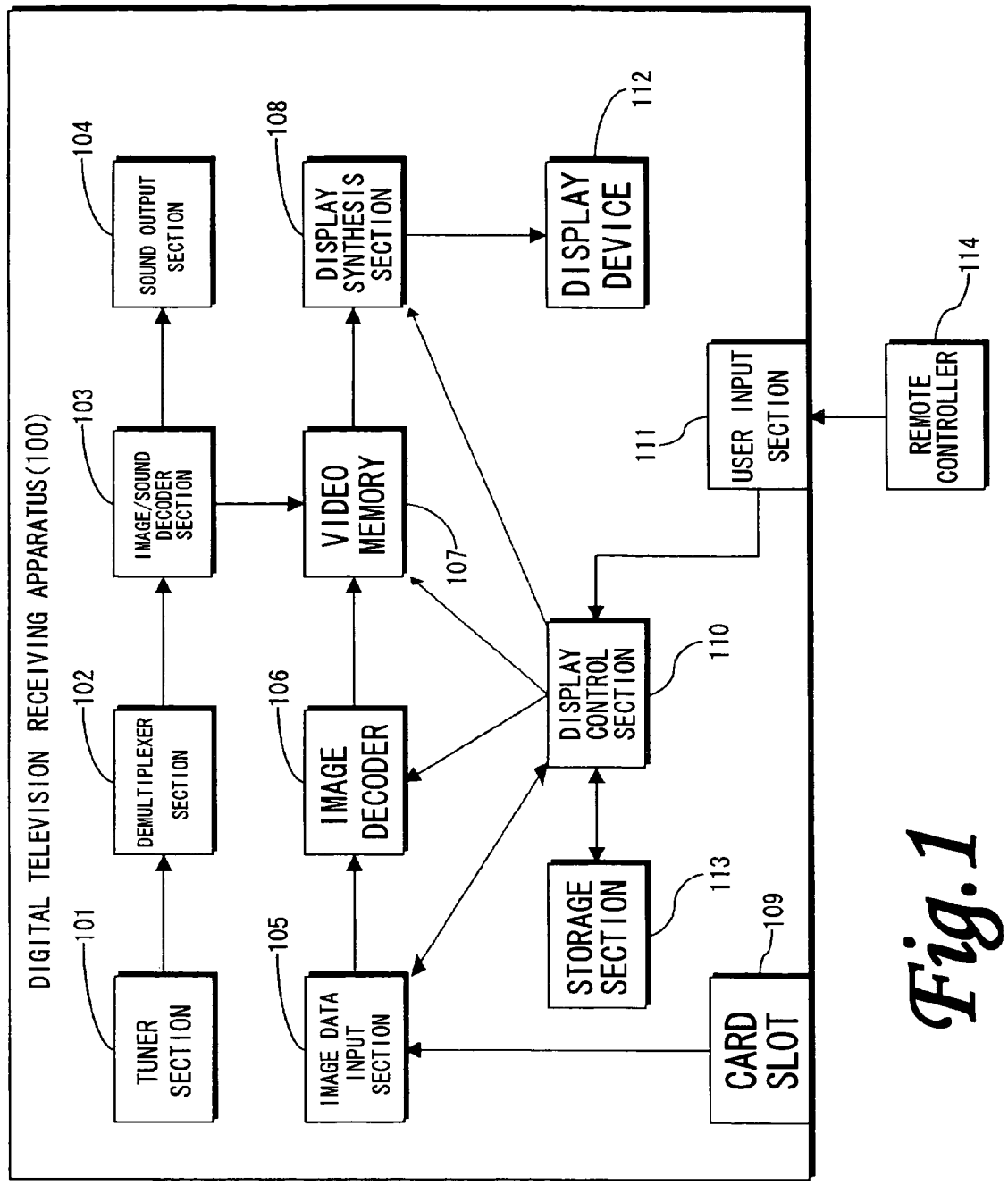
FIG. 1 is a block diagram showing the configuration of a digital television according to a first embodiment of the present invention.

First, an image display controlling apparatus according to the first embodiment according to the present invention will be explained. FIG. 1 shows the configuration of a digital television receiving apparatus 100 as an example of an image display controlling apparatus according to the first embodiment.

(Digital Television Receiving Apparatus)

First, a signal received by an antenna (not shown) is inputted into a tuner section 101 shown in FIG. 1. By executing processes such as demodulation and error correction to the inputted signal by the tuner section 101, digital data of a transport stream system are produced. Furthermore, a scramble release process is executed to the produced transport stream (TS) data by the tuner section 101 so as to be supplied to a demultiplexer section 102.

By the demultiplexer section 102, the video data and the audio data are taken out from the TS data provided by the time division multiplexing of the video, audio data and electronic program guide (PG) data and the data broadcast data, or the like supplied from the tuner section 101 so as to be supplied to a image/sound decoder section 103. The video data processed by the image/sound decoder section 103 are written in a video memory 107. The video data written in the video memory 107 are supplied to a display device 112 as an image displaying means via a display synthesis section 108. On the other hand, the audio data processed by the image/sound decoder section 103 are outputted from an audio output section 104.

A card slot 109 is an interface for the connection with a removable memory card, or the like. According to the first embodiment, it is used for inputting the image data photographed by a digital camera. The image data input section 105 is an input circuit for inputting the digital image data from a memory card (not shown) connected with the card slot 109. The image processing section 106 is for applying an image process to the digital image data inputted from the image data input section 105. The digital image data with the image process applied are stored in a video memory 107 as one of the memory means.

A display control section 110 is an arithmetic processing unit comprising, for example, a CPU (central processing unit). The display control section is a control circuit for commanding reading of the image to the image data input section 105, commanding execution of the process to the image processing section 106, writing the display data to the video memory 107, commanding the synthesis process to the display synthesis section 108, and commanding storage of the information to the storage section 113 as the memory means. Moreover, the display control section 110 to serve as the adjusting means and the evaluation means can obtain the input data from the remote controller 114 via the user input section 111. Moreover, the display control section 110 serves also as the related information obtaining section for obtaining the photographing data applied to the digital image data via the image data input section 105. Moreover, in the case the image display controlling method according to the present invention is realized as a software program, various processing steps are executed by the display control section according to the program. Moreover, the display control section 110 serves also as a so-called layout determining section for controlling the display position of the image data based on the related information obtained from the image data by the cooperation with the image processing section 106.

(Remote Controller Device)

Figure 2:
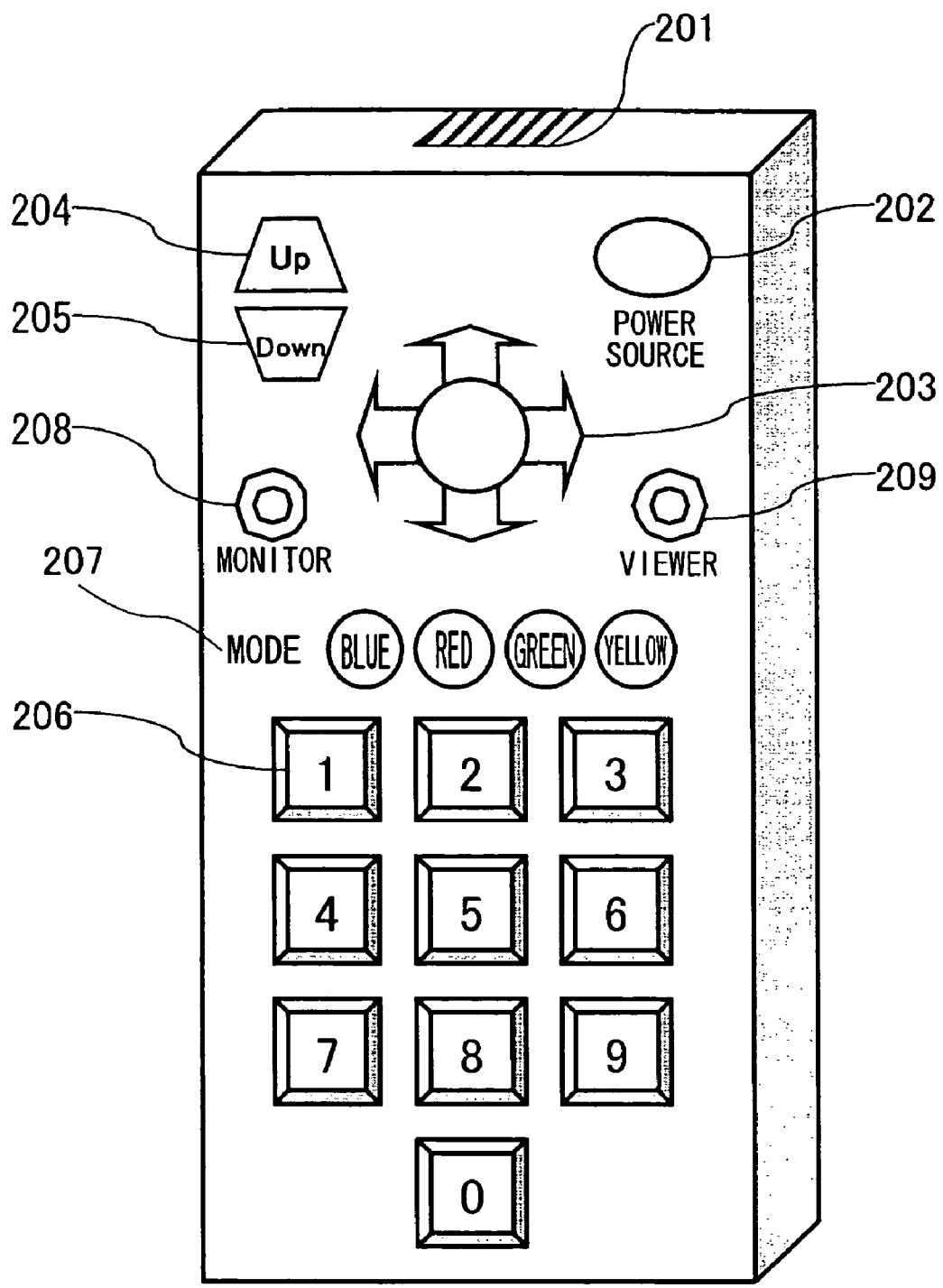
FIG. 2 is a schematic perspective view of a remote controller for the operation of the digital television according to the first embodiment of the present invention.

Next, the remote controller device for supplying an operation signal to the DIGITAL TELEVISION RECEIVING APPARATUS by the user will be explained. FIG. 2 shows the remote controller 114 according to the first embodiment.

As shown in FIG. 2, a light emitting section 201 is a light emitting element circuit for executing the infrared ray communication between the remote controller 114 and the receiving section comprising the user input section 111 shown in FIG. 1.

A power source key 202 is a key for turning on or off the power source. A cursor determining key 203 comprises a cursor key and a determining key with the determining key disposed in the center of the up, down, right and left buttons.

The up and down keys 204, 205 comprises mainly two keys of up and down. Numeral keys 206 comprise numeral keys of 1 to 9 and 0 arranged in a matrix. Color keys 207 comprise, for example, buttons of four colors including blue, red, green and yellow.

Moreover, a monitor board key 208 is a key for switching the display mode to be displayed on the television receiving unit. Furthermore, a viewer key 209 is a key for calling the image viewer function. The remote controller 114 shown in FIG. 2 shows only the buttons for the operation for realizing the function necessary for explaining the first embodiment, and thus the buttons necessary for the actual receiver unit are not limited to those shown in FIG. 2.

The image data used as an example in the first embodiment are still image and video data photographed by the digital camera. As the still image data, those recorded in the memory card as the still image data film after applying the JPEG compression process by the digital camera are used. Moreover, as the video data, as in the case of the still image data, an image group with the JPEG compression process applied per frame unit by the digital camera, recorded in the memory card as the video image data file are used. In the description hereafter, the "image data" denote at least one of the still image data and the video image data.

Then, each image data have the information at the time of photographing by the digital camera applied. The information at the time of photographing includes in addition to the photographing date and time and the type of the camera, for example, the photographing scene mode, the focus position information showing the focus position in the finder at the time of photographing, the stroboscope light emission state information, the information showing the distance with respect to the object, the zooming state information, or the like as the attention area information. According to the digital camera used in the first embodiment, one having any of "left", "middle", "right" recorded as the focus position information in the finder at the time of photographing is used.

FIG. 3 shows a screen example to be displayed on the liquid crystal screen of the digital camera used in the first embodiment. FIG. 3A shows the screen state of the liquid crystal screen before touching the shutter button by hand, and FIG. 3B shows the state with the left side rectangular area focused after lightly pressing the shutter button, that is, "half pressing" the shutter button.

(Operation of the Digital Television Receiving Apparatus)

Next, the operation of the digital television receiving apparatus 100 according to the first embodiment will be explained. The list display of the digital images in the digital television receiving apparatus 100 according to the first embodiment will be started by an operation of calling the image viewer function by the remote controller operation after loading and mounting the memory card into the card slot 109 by the user.

FIG. 5 shows the kinds of the attention areas to be set by the image viewer according to the image data. Here, as the attention area, different ones are set according to the focus position and the photographing scene mode. Moreover, the attention area shown in FIG. 5A is the area with the photographer attention area around the focus point at the time of photographing.

According to the first embodiment, the attention area is a round area with a radius $r_1$ around the focus point position on the image data set by the focus position information, and three areas are set according to the "left", "middle" and "right" of the focus position information. Moreover, the attention area shown in FIG. 5B can be changed based on the photographing mode information. That is, the photographer attention area in the person mode shown in FIG. 5B is a round area with a radius $r_2$ in the central section of the screen, and the photographer attention area in the scenery mode is an elliptical area with a shorter radius $r_2$ in the central section of the screen and a longer radius $r_2 \times 2$. Moreover, the attention area shown in FIG. 5C is the attention area to be used in the case the focus position information and the photographing mode information are not present, which is set as a round area with a radius $r_3$ in the substantially central section in the image data.

Figure 4:
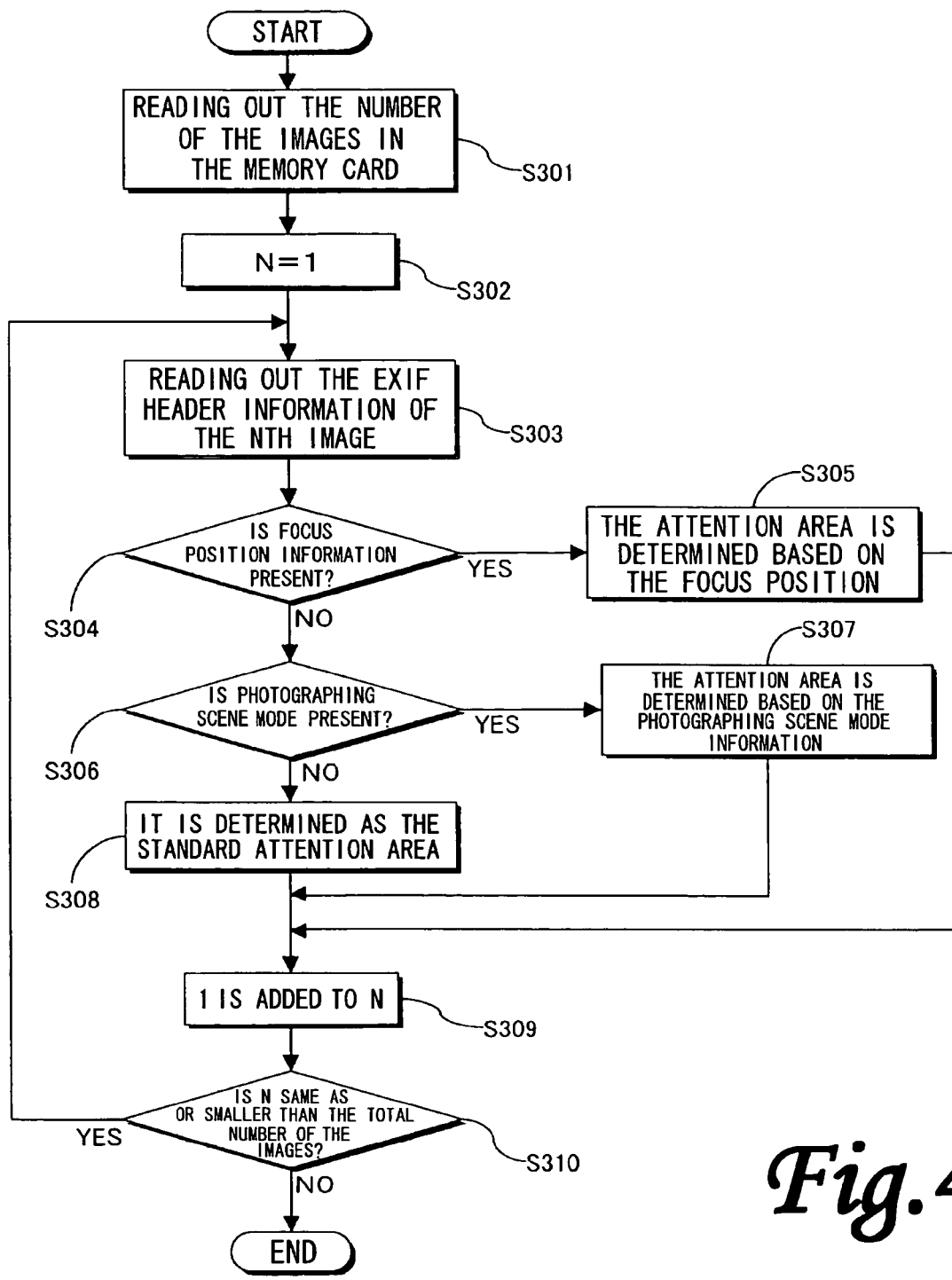
FIG. 4 is a flow chart for explaining the display control according to the first embodiment of the present invention.

In the case the "viewer" key 209 of the remote controller is pressed shown in FIG. 2 is pressed by the user, the display control section 110 starts the process shown in FIG. 4.

That is, first, in the step S301, the total number of the image files present in the memory card inserted in the card slot 109 is read out and stored by the display control section 110 via the image data input section 105.

Then, in the next step S302, 1 is set in the counter N for showing the ordinal number of the image data so as to be initialized. Thereafter, in the step S303, the Exif header information of the Nth image file is read out. In this stage, the Exif header information of the first image file is read out.

Then, in the step S304, whether or not the focus position information is included in the Exif header information of a predetermined image is judged. As a result, in the case the focus position information is included in the Exif header information, it proceeds to the step S305 so that the attention area of the focus position corresponding to the focus position information is determined by the display control section 110 out of the three attention areas of the left focus point attention area, the central focus attention area and the right focus point attention area shown in FIG. 5A. In contrary, in the case the focus position information is not included in the image data, it proceeds to the step S306 so that whether or not the photographing scene mode information is included is judged by the display control section 110.

In the case the photographing scene mode is included in the image data in the step S306, it proceeds to the step S307 so that the attention area corresponding to the photographing scene mode information is determined out of the attention areas shown in FIG. 5B. On the other hand, in the case any information out of the focus position information and the photographing scene mode information is not included in the Exif header information, it proceeds to the step S308 so that the standard attention area shown in FIG. 5C is determined by the display control section 110.

Thereafter, it proceeds to the step S309 so as to add 1 to the counter N. Then, it proceeds to the step S310 so that whether or not the counter N is the same as or less than the image total number is judged. As a result of the judgment, in the case the counter N is not same as or less than the image total number, that is, the value of the counter N is more than the image total number, the list display process is finished. On the other hand, in the case the counter N is same as or less than the image total number, it returns to the step S308 so as to execute successively the same processes to the image data by the display control section 110. Thereby, the attention area is determined successively for each image data for the image total number (steps S309, S310).

At the stage with the attention areas set for the all image data, the operation process is finished. Then, the attention areas set as mentioned above are stored in the storage section 113 together with the photographing information applied to the image data.

(Process for Determining the Protection Area)

Figure 6:
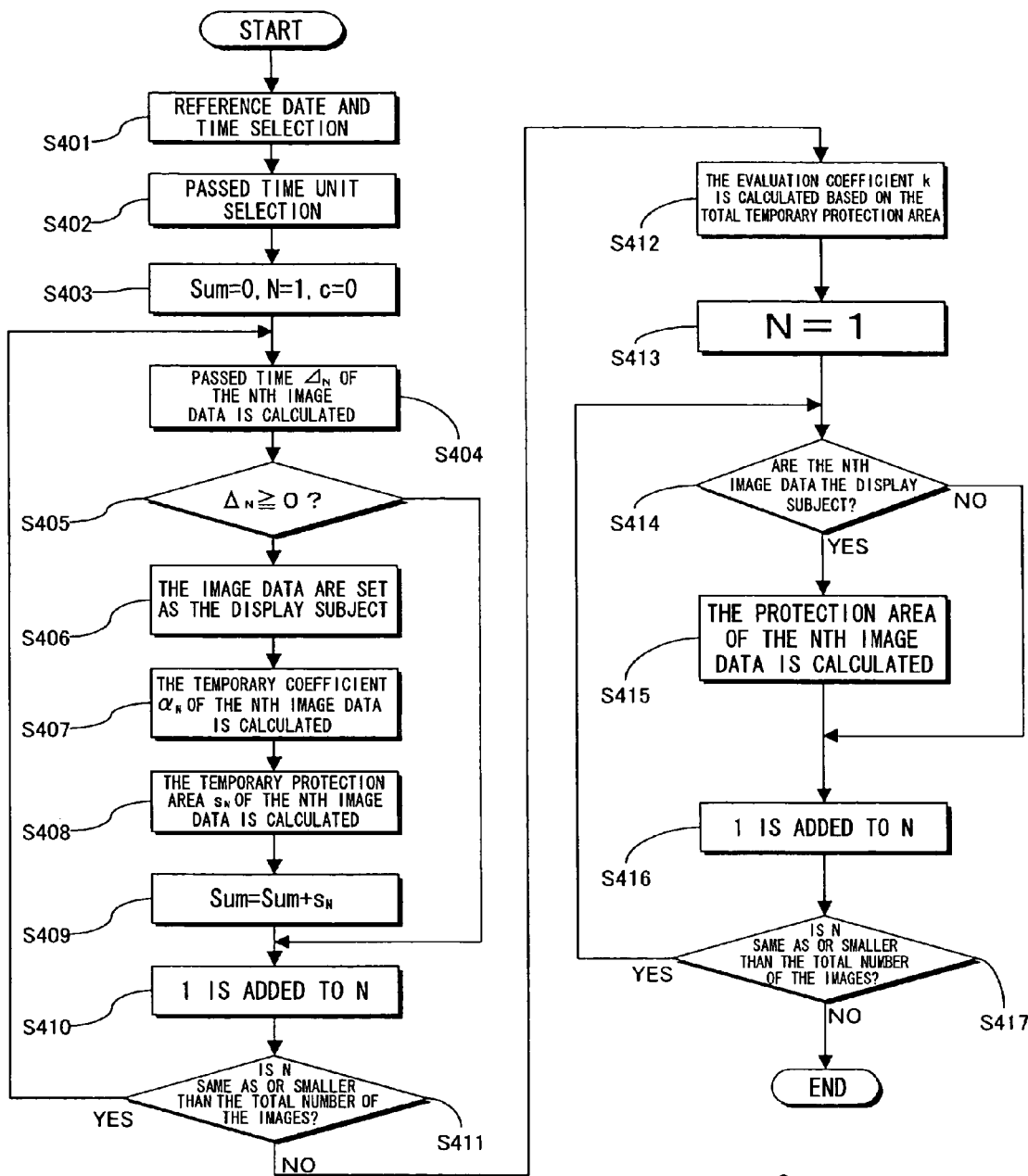
FIG. 6 is a flow chart for explaining the process for determining the protection area according to the first embodiment of the present invention.

Next, the protection area in each image data will be determined according to the photographing date and time information (hereinafter, it is referred to as the date and time information) as the date and time information included in each image data. That is, as to the size of the protection area, a different area is provided according to the attention area and the photographing date and time of the individual image. The method for determining the protection area for each image data will be explained specifically hereafter. FIG. 6 shows the process for determining the protection area by evaluation of the attention area applied to the image data based on the photographing date and time information. Here, the protection area is the area to be protected in the display control so as not to be displayed with the other image data superimposed thereon.

That is, as shown in FIG. 6, first, in the step S401, the date and time to be the reference of the display control will be set. Here, the latest date and time information is selected out of the date and time information of the image data to be displayed. In other words, the display control is executed mainly for the image data photographed at the nearest point.

Next, it proceeds to the step S402 so that the time unit at the time of calculating the passed time from the standard date and time will be selected. Specifically, for example, it is selected based on the difference with respect to the time and date farthest from the reference time and date out of the time and date information of the image data to be displayed. Then, in the case the difference is more than one day or several days (specifically, for example, 3 days), the day is selected as the unit, and in the case it is more than several months (specifically, for example, 3 months), the month is selected as the unit. On the contrary, in the case the difference is less than 1 day, the hour or the minute is selected.

Next, it proceeds to the step S403 so that the integration variable Sum of the total temporary protection area to be described later, and the counter N of the image data and the counter c are initialized. Specifically, the integration variable Sum of the total temporary protection area is set at 0, the counter N at 1 and c at 0.

Thereafter, it proceeds to the step S404 so that the attention area of the image data are evaluated based on the date and time data. Specifically, the passed time $\Delta_N$ from the photographing date and time information to the standard date and time is calculated based on the selected passed time unit concerning the Nth image data.

Thereafter, it proceeds to the step S405 so that whether or not $\Delta_N$ is 0 or more is judged. As a result of the judgment, in the case $\Delta_N$ is negative, that is, the standard date and time is former than the photographing date and time, the image data are not dealt with as the display subject so that it proceeds to the step S410 to be described later. On the other hand, in the case $\Delta_N$ is 0 or positive, it proceeds to the step S406 so that the image data are dealt with as the display subject.

Thereafter, it proceeds to the step S407 so that the temporary evaluation coefficient $\alpha_N$ of the attention area is calculated in a form including the coefficient k based on the passed time. Here, the temporary evaluation coefficient $\alpha_N$ is the coefficient for evaluating the attention area and calculating the protection area according to the passed time $\Delta_N$ from the photographing date and time of the image data N to the reference date and time. According to the first embodiment, it is defined by the formula 1 such that the protection area becomes gradually smaller according to the passed time.

$$\alpha_N = \exp(-k\Delta_N) \quad \text{(formula 1)}$$

Then, it proceeds to the step S408. Here, the protection area is the area to be obtained by evaluating the area of the attention area $s_{ON}$ in proportion to the coefficient of the formula 1. That is, the temporary area $s_N$ of the protection area of the image data N can be calculated by the following formula 2.

$$s_N = \alpha_N \times s_{ON} \quad \text{(formula 2)}$$

As mentioned above, the attention area in the first embodiment is defined by a circle having a radius $r_1$, $r_3$, or an ellipse having longer diameter and shorter diameter of $2r_2$ and $r_2$. Therefore, the temporary area $s_{ON}$ of the attention area is calculated by the following (formula 3) to (formula 6), respectively.

(Attention Area According to the Focus Position Information)

$$S_{ON}=\pi(r_1)^2 \quad \text{(formula 3)}$$

(Photographing Mode Information: Attention area by the Person Mode)

$$S_{ON}=\pi(r_2)^2 \quad \text{(formula 4)}$$

(Photographing c Mode Information: Attention area by the Scenery Mode)

$$S_{ON}=2\pi(r_2)^2 \quad \text{(formula 5)}$$

(Attention area in the Case of not Having the Photographing Information)

$$S_{ON}=\pi(r_3)^2 \quad \text{(formula 6)}$$

That is, in the step S409, the temporary total area Sum of the protection area integrated for the N pieces of image data is calculated as a polynomial of k by developing the (formula 1) to an appropriate progression. The following (formula 7) is the case of the polynomial development to the binomial term of k.

$$\text{Sum}=ak^2+bk+c \quad \text{(formula 7)}$$

After executing the calculations, in the step S410, 1 is added to the counter N for the calculation of the processed number of pieces.

The calculation in the above-mentioned steps S404 to step S409 is repeated until the number of the image data to be processed exceeds the total number of the images.

In the case the calculation process is executed for the all image data to be processed, then, it proceeds to the step S412 so that the coefficient k for displaying the image data on the display area is calculated. That is, as it will be described later, the position control for not superimposing the protection areas with the other parts superimposed with each other is executed. Moreover, on the other hand, the area not to be superimposed on the outside of the protection area is present. Then, the area Sum of the protection area should be disposed in the displayable area, that is, in the area of the display area $S_{all}$. Thereby, with the ratio of the protection area effective with respect to the display area represented as the superimposition efficiency $\beta$, the (formula 8) condition is needed.

$$S_{all} \geq (1/\beta) \times \text{Sum} \quad \text{(formula 8)}$$

Then, in the step S412, the coefficient k for setting the protection area by evaluating the attention area according to the passed time to the standard date and time is calculated by the (formula 7).

Then, after initializing the counter N (N=1) in the step S413, the steps S414 to S417 are executed successively. Thereby, from the $\Delta_N$ calculated already in the step S404 and the k calculated in the step S412, $s_{ON}$ satisfying the formula 2 and $r_{N1}$, $r_{N2}$ or $r_{N3}$ according to the kind of the attention area are calculated for each image data N so as to set the protection area. Here, $r_{N1}$, $r_{N2}$ or $r_{N3}$ are calculated by the following formulae.

(Attention Area According to the Focus Position Information)

$$S_N=\pi(r_{N1})^2 \quad \text{(formula 9)}$$

(Photographing Mode Information: Attention Area by the Person Mode)

$$S_N=\pi(r_{N2})^2 \quad \text{(formula 10)}$$

(Photographing Mode Information: Attention Area by the Scenery Mode)

$$S_N=2\pi(r_{N2})^2 \quad \text{(formula 11)}$$

(Attention Area in the Case of not Having the Photographing Information)

$$S_N=\pi(r_{N3})^2 \quad \text{(formula 12)}$$

(Control of the Display Process)

Next, the control of the display process based on the protection area evaluated and set as mentioned above will be explained. According to the display process of the first embodiment, efficient arrangement and display is purposed by adjusting the display positions of the image data of a plurality of pieces and the upper and lower relationship of the superimposition without superimposing the protection areas of the image data.

Here, first, the image data to be newly arranged are disposed at a position with the outer rim of the protection areas thereof to be contacted on the outer rim of the display areas of the image data already arranged. Moreover, in the area with the display areas of the image data superimposed, the image data display to be newly disposed are superimposed below the image data display already disposed. At the same time, the position to have the display area increase by the new arrangement minimally is selected. That is, at least one pattern to have the minimum area including the protection area to be displayed is retrieved so that the smallest pattern out of the minimum patterns is determined. Reversely, a combination to have the maximum superimposition area of the area other than the protection area out of the display area of the image data is retrieved and arranged. Here, for simplifying the retrieval process, first, a position to have the minimum value of the distance from the center of the display area to the outer rim of the display area of the image data already disposed is regarded as the arrangement candidate position. Then, a position capable of ensuring the display without superimposing the protection areas is retrieved around the position so that the total display area in the case of arranging the image data at the retrieved position is calculated. After calculating the total display area for a plurality of times, the position with the smallest display area is determined as the arrangement position out of the plurality of the arrangement candidate positions. The detailed procedure thereof is shown in FIG. 7.

Figure 7:
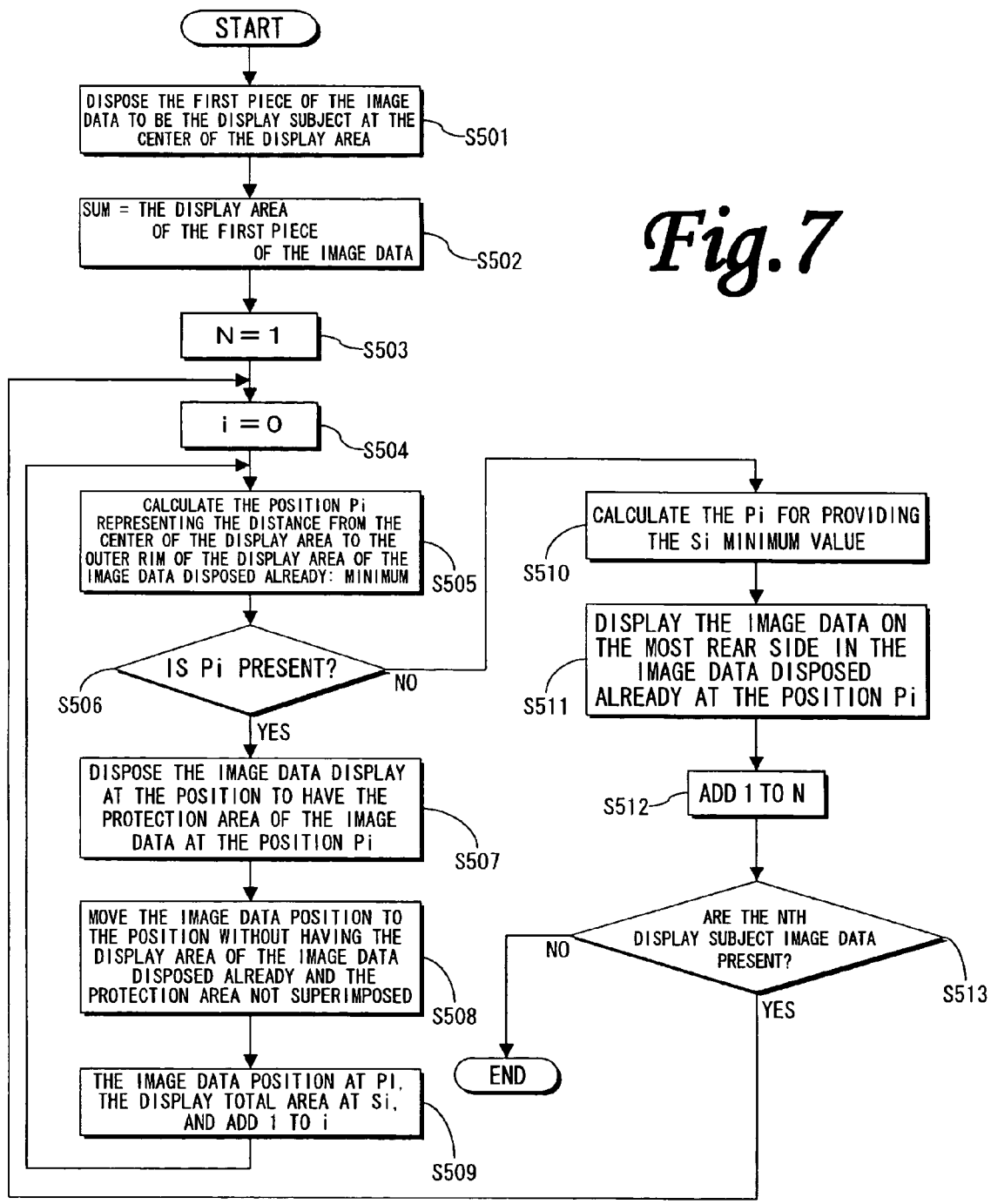
FIG. 7 is a flow chart for explaining the display control according to the first embodiment of the present invention.
Figure 8A:
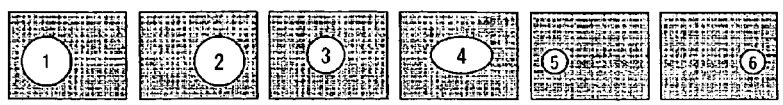
FIG. 8A is a schematic diagram showing the display state on the image data display screen according to the first embodiment of the present invention.
Figure 8B:
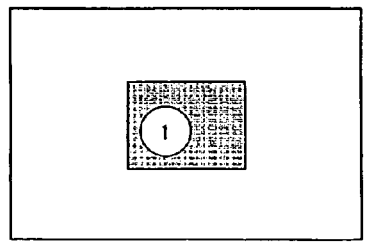
FIG. 8B is a schematic diagram showing the display state on the image data display screen according to the first embodiment of the present invention.
Figure 8E:
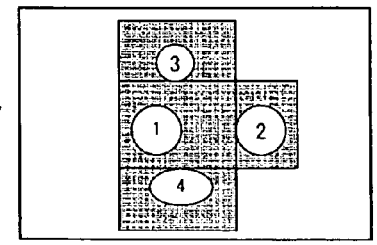
FIG. 8E is a schematic diagram showing the display state on the image data display screen according to the first embodiment of the present invention.
Figure 8C:
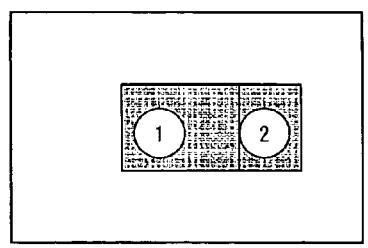
FIG. 8C is a schematic diagram showing the display state on the image data display screen according to the first embodiment of the present invention.
Figure 8F:
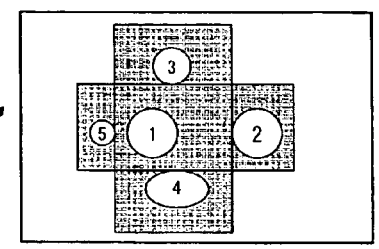
FIG. 8F is a schematic diagram showing the display state on the image data display screen according to the first embodiment of the present invention.
Figure 8D:
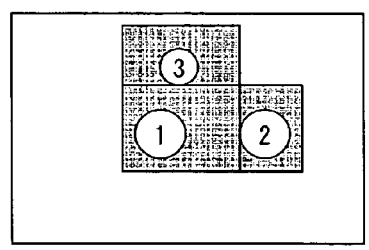
FIG. 8D is a schematic diagram showing the display state on the image data display screen according to the first embodiment of the present invention.
Figure 8G:
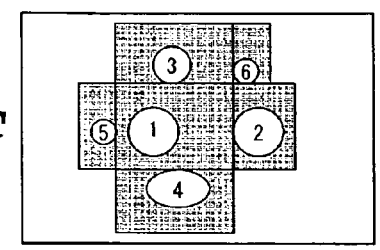
FIG. 8G is a schematic diagram showing the display state on the image data display screen according to the first embodiment of the present invention.

As shown in FIG. 7, first, in the step S501, the first piece of the image data to be the display subject is arranged in the center of the display area. Then, it proceeds to the step S502 so that the total area Sum is initialized with the total area Sum of the display area as the first image data of the display area. Moreover, the counter N of the processed number of pieces is initialized (N=1). Then, it proceeds to the step S504 so that the count i for counting the number of times of the pattern retrieval is initialized (i=0). Thereafter, in the step S505, the position $P_i$ to have the minimum distance from the center of the display area to the outer rim of the display area of the image data already arranged is calculated.

Then, it proceeds to the step S506 so that whether or not another position to have the minimum value is present is judged. In the case the position to have the minimum value is present, it proceeds to the step S507 so that the image data display is disposed at the position to have the minimum value. Thereafter, it proceeds to the step S508 so that the image data position is moved to the limit position without superimposing the protection areas in the image data newly arranged in the display area of the image data newly arranged and the display area of the image data already arranged.

Thereafter, it proceeds to the step S509 so that the limit position without superimposing the protection areas in the image data newly arranged is set as the position $P_i$. Moreover, the display total area at the time, that is, the area obtained by subtracting the area of the superimposed portion from the total of the display area of the already arranged image data and the display area of the image data newly arranged is provided as Si. Furthermore, 1 is added to the counter i of the number of the processes.

Then, these steps S505 to S509 are executed until the above-mentioned position to have the minimum value is not present for the same image data. At the stage with the position becomes absent, it proceeds from the step S506 to the step S510.

In the step S510, the position to have the minimum display total area Si shown in the step S509 is calculated at a plurality of the positions $P_i$. Then, the display total area Si in the case of disposing the image data at the positions $P_i$ to have the minimum value is provided as the total area Sum.

Next, it proceeds to the step S511 so that the new image data with the position confirmed at the positions $P_i$ are displayed on the rearmost side (lower side) with respect to the image data already disposed. Thereafter, it proceeds to the step S512 so as to add 1 to the counter N for the processed number of pieces. Then, it proceeds to the step S513 so that whether or not the image data to be the Nth display subject are present is judged.

In the case the image data are present, it proceeds to the step S504 so that the steps S504 to S513 are executed repeatedly according to each process. Then, the control of the display process is finished at the stage with the display subject image data are not present.

Moreover, FIG. 8 shows schematically the state of the image data disposed according to the above-mentioned process procedure on the display screen. FIG. 8A shows schematically the protection area set for the image data to be arranged. FIGS. 8B to 8G schematically show the state of successively displaying the image data (1 to 6) according to the process procedure. In the description herebelow, the calculation concerning the position and the area is based on the pixel unit as the unit length for the display control. In FIG. 8, the void part with the numeral is the protection area.

Figure 9A:
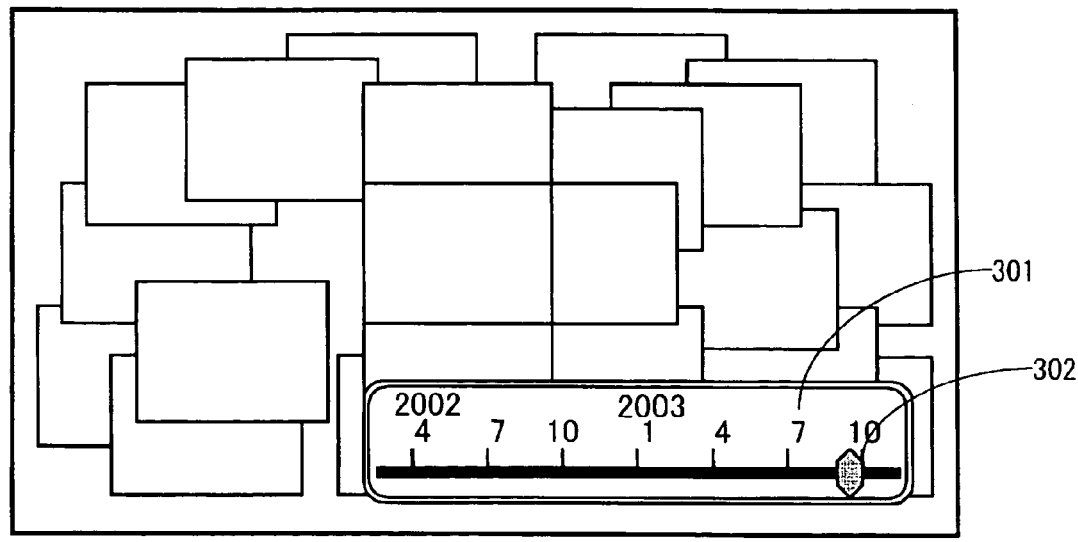
FIG. 9A is a schematic diagram showing the display state according to the first embodiment of the present invention.

FIG. 9A shows an example with the image data of 27 pieces displayed according to the above-mentioned control procedure. These image data are the all image data in the first embodiment, which are photographed and stored in the duration from April 2002 to October 2003. As mentioned above, the display was executed according to the display control with the latest photograph date and time selected as the standard date and time out of the photograph date and time information of the image data as the concerning information based on the "day" as the unit. In FIG. 9, since the display control is executed from the image data with the newer date and time information, the latest photograph date image data are disposed in the center and the older photograph image data are disposed in the periphery.

Moreover, according to the first embodiment, the standard date and time can be selected according to the user operation. That is, as shown in FIG. 9A, a time axis 301 representing the range of the image data photograph date and time is displayed as the graphic displayed on the screen for selecting the reference date and time. Moreover, the graphic representing a slide bar 302 for adjusting the standard date and time is displayed on the axis. According to these graphics, the user can move the slide bar 302 according to the operation of the right and left buttons of the remote controller.

Moreover, the standard date and time can be set according to the position of the slide bar 302. The time axis representing the range of the photograph date and time is adjusted according to the photograph date and time information of the image data to be the subject of the display control. Moreover, the graduations on the axis are adjusted according to the passed time unit selected in the display control. The position of the slide bar 302 shown in FIG. 9A denotes that the latest photograph date and time information of the image data to be the subject of the display control is set as the reference date and time. Then, FIG. 9A shows the state with the all image data to be the subject of the result display control displayed.

Figure 9B:
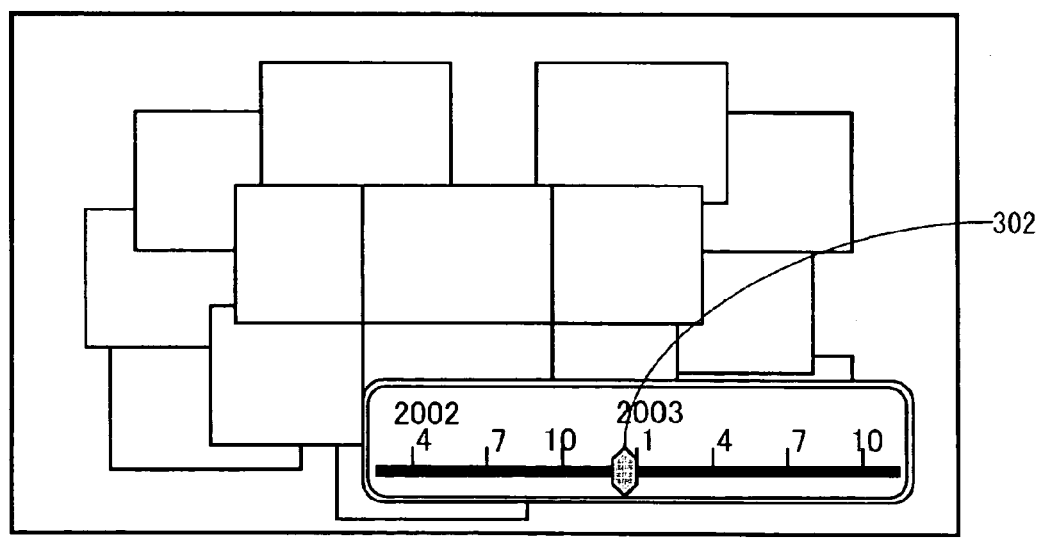
FIG. 9B is a schematic diagram showing the display state according to the first embodiment of the present invention.

FIG. 9B shows the state with the standard date and time adjusted according to the user operation at December 2002 in the halfway of the range of the photograph date and time of the image data to be the subject. In the first embodiment, the image data with the photograph date and time information before the standard date and time are 16 pieces. Therefore, the above-mentioned display control process procedure mentioned above is executed for the image data of the 16 pieces so as to be displayed accordingly.

The control of displaying the image data prior to the standard date and time without displaying the image data thereafter is included in the operation of the above-mentioned display control section 110. That is, according to the process of setting the protection area for each image data (FIG. 6), only the image data having a positive passed time $\Delta_N$ from the standard date and time to the image data photograph date and time information are provided as the display subject (S406), and the protection area is calculated for the image data to be the display subject (S414, S415). Moreover, according to the display process based on the set protection area shown in FIG. 7, the process procedure of the judgment of dealing with only the images to be the display subject is provided in the step S501 and the step S513.

As explained above, according to the first embodiment, at the time of displaying the image data with a part of the display ranges superimposed with each other in order to display a large number of image data, the control operation is executed such that the attention areas are provided as the protection area not to be hidden by the superimposition. Thereby, even in the case a part of the display area of the image data is hidden by the display of the other image data, display can be executed with the user's photograph intention maintained. Thereby, display can be provided such that the user can easily find out the purposed photograph.

That is, in the case of photographing with a digital camera having a plurality of focus positions by the user in general, the user himself photographs while confirming the focus onto the part regarded as important. Therefore, in the case the user understands the display or finds out the purposed image data while displaying a plurality of the photographed image data, the area regarded as important at the time of photographing, that is, the attention area is the important key.

Furthermore, as to the attention areas, by setting the protection area by evaluating the attention areas of the older image data narrower according to the date and time information of the image data, a larger number of image data can be displayed.

Moreover, since the image data with newer date and time are displayed on the front side, the older image data are hidden gradually behind the newer image data while maintaining the display of the characteristic attention areas recognizably. The display change is close to the state of successively disposing newer prints of a large number of photographs printed actually on older prints, it can easily be accepted as to the user's operation convenience. Also in this case, since the image data are superimposed with the attention areas displayed as much as possible, the nature of maintaining the photographing intention so as to facilitate the purposed photograph finding out operation can be maintained.

Furthermore, by changing the standard date and time so that the image data prior to the standard date and time are displayed again according to the same display control, the parts hidden by the image data newer than the standard date and time can be displayed larger again so that the image data in the date and time range can easily be judged. Since the display state is close to the state of reproducing the past state by eliminating the prints newer than the standard date and time in the actual state of superimposing the prints, it can be provided to the user as a function with a familiar operation convenience.

Although the case of displaying the image data prior to the standard date and time has been explained in the first embodiment explained above, it is also possible to display only the image data newer than the reference date and time, or provide two reference dates and times so as to display the image data included in the period defined thereby. Also in these cases, by evaluating the attention areas using the date and time to be the reference for setting the protection areas according to the display purpose so as to adjust the display positions according to the above-mentioned process procedure, a display capable of easily finding out the purposed photograph by storing the image data photograph intention while displaying a larger number of the image data can be enabled.

On the other hand, also in the case of photographing using the photograph scene mode of "scenery" or "person", the attention area substantially impressive to the user can be set. For example, in the case of a scenery photograph, the scenery as a whole remains as the user's "impression" in most cases so that it is necessary to find out the portion for judging and selecting the photograph. Moreover, in the case of a personal photograph, the face portion is the photographing intention in most cases so that the face tends to be disposed in the central area of the photograph image in most cases.

By displaying such an attention areas while protecting without being hidden by the "superimposition", like the case of the attention areas by the evaluation position, display can be executed while maintaining the intention at the time of photographing by the user as well as display can be executed while facilitating the operation of finding out the purposed photograph.

Moreover, as to the attention areas, by setting the protection area by evaluating the attention areas of the older image data narrower according to the date and time information of the image data, a larger amount of the image data can be displayed while maintaining the nature of facilitating the operation of finding out the purposed photograph while storing the photographing intention so that the familiar operation convenience can further be provided by the change of the reference date and time.

Moreover, although the two kinds of the "scenery" and "person" photographing scene modes have been presented in the above-mentioned first embodiment, it is not limited thereto. Also in the case of using the photographing scene modes of "night view", "macro", or the like, display can be controlled by setting the attention areas reflecting the photographing scene intention.

Second Embodiment

Figure 10:
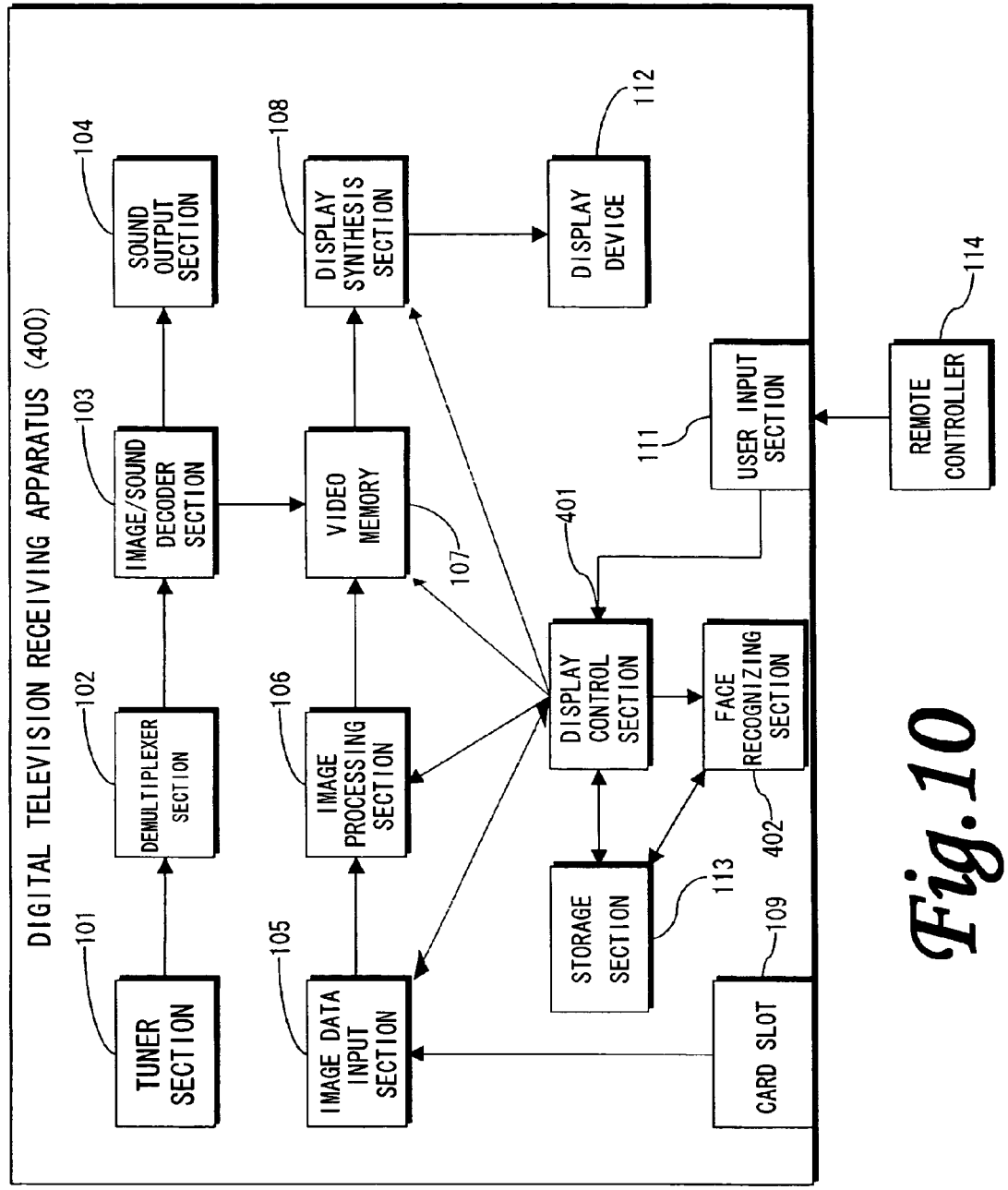
FIG. 10 is a block diagram showing the configuration of a digital television according to a second embodiment of the present invention.

Next, an image display controlling apparatus according to the second embodiment according to the present invention will be explained. According to the second embodiment, the case of executing the display control of the image data by the attention area information having the distribution concerning the attention degree will be explained. In the second embodiment herebelow, the parts different from those of the first embodiment will be explained and the configurations same as those of the first embodiment will not be explained. FIG. 10 shows the configuration of the digital television receiving apparatus 400 as an example of the image display controlling apparatus according to the second embodiment.

Like the display control section 110 according to the first embodiment, the display control section 401 commands reading of the image to the image data input section 105, commands execution of the process to the image processing section 106, writes the display data to the video memory 107, commands the synthesis process to the display synthesis section 108, and commands storage of the information to the storage section 113 as the memory means. Moreover, the display control section 401 as the evaluation means and the adjusting means obtains the input data from the remote controller 114 via the user input section 111, and functions as a related information obtaining section for obtaining the photographing data applied to the digital image data via the image data input section 105. Furthermore, according to the second embodiment, the display control section 401 functions as a display control section in cooperation with the image processing section 106 by obtaining the attention area distribution in the image data stored in the storage section 113 by controlling the face recognizing section 402.

In the case the image data stored in the storage section 113 are inputted according to the command of the display control section, the face recognizing section 402 detects the face area of a person present in the image data so as to output the attention area information having the probability distribution. The attention area information is stored in the storage section 113 as a part of the image data related information.

Figure 11A:
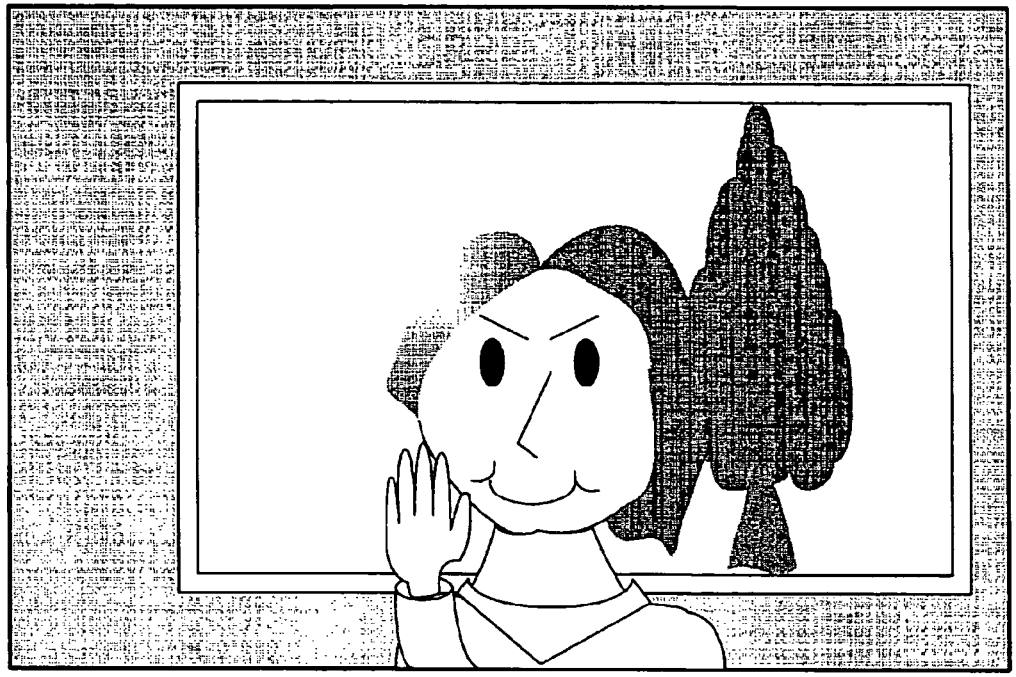
FIG. 11A is a schematic diagram for explaining the face recognizing function according to the second embodiment of the present invention.
Figure 11B:
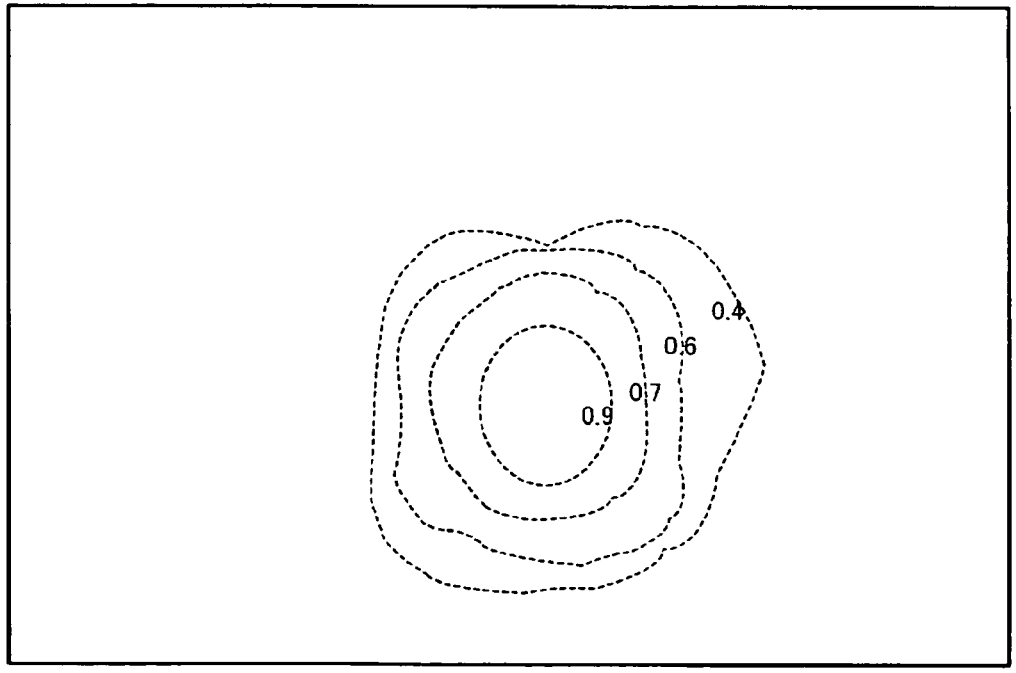
FIG. 11B is a schematic diagram for explaining the face recognizing function according to the second embodiment of the present invention.

FIG. 11 shows the function of the face recognizing section 402. FIG. 11A shows an example of the image data to be inputted to the face recognizing section 402. The face recognizing section 402 first extracts the characteristic patterns of the parts of the eyes, the mouth, or the like of a person out of the image data. Next, it extracts the person's skin color area around the eyes and the mouth and the hair area so as to recognize the range as the face area. Then, according to the recognition, the area information having the recognition probability distribution is outputted. The output example is shown schematically in FIG. 11B. The image data shown in FIG. 11A is the photograph of a person near the window. From the face central section provided with an appropriate exposure, the eyes, the mouth and the skin section are extracted with a high probability.

However, since the right hand of the person in the image is at a position on a part of the face, the skin area extends beyond the original face range so that the skin color area shape is too unnatural to be judged as it is as the face area, and furthermore, the boundary of the original face area can hardly be judged. Therefore, the face area of the right cheek portion of the person is recognized as a distribution to have the probability lowered gradually. Moreover, as to the expansion of the person's hair area, the left head section (on the right side in FIG. 9A) is mixed with the dark part of the tree in the background, and furthermore, the right head part (on the left side in FIG. 9A) has the highlight by the external light beam reflection is mixed with the bright part in the background so as to be recognized as the probability distribution.

According to the second embodiment, the display control section 401 extracts each image data by the face recognizing section 402. With the "face recognition probability distribution" to be stored in the storage section 113 as the related information provided as the attention area, the image display process in the image viewer function is executed.

Figure 12:
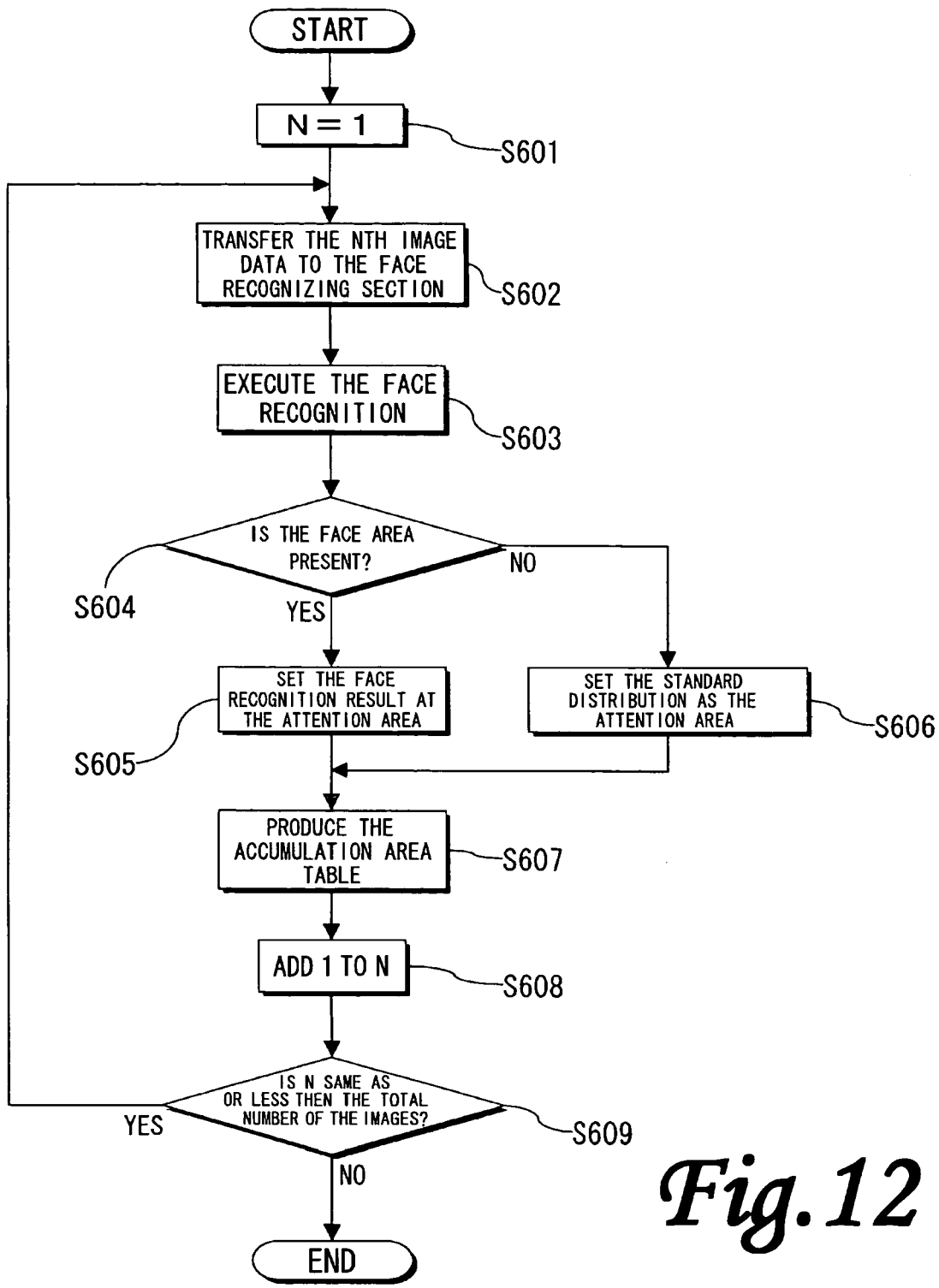
FIG. 12 is a flow chart for explaining the display control according to the second embodiment of the present invention.

FIG. 12 shows the attention area information applying control to be executed at the time of starting the drive of the viewer function by the display control section 401. First, after setting the counter N for the pieces of the image data is initiated so as to be set at 1, it proceeds to the step S602 so that the Nth image data are transferred to the face recognizing section 402 by the display control section 401. Thereafter, it proceeds to the step S603 so that the face recognizing section 402 is controlled so as to analyze the attention area so as to execute the so-called face recognizing process. Thereafter, in the step S604, whether or not the face area is present is judged.

In the case the recognizable face area is extracted in the image data, it proceeds to the step S605 so that the probability distribution according to the face recognizing process is set as the attention area information of the image data. Thereafter, in the step S607, the accumulation area table is produced. The accumulation area table is the data representing the area of a certain probability or more in the probability distribution of the image data by the number of the pixels. FIG. 13 shows schematically an example of the accumulation area table.

Figure 14:
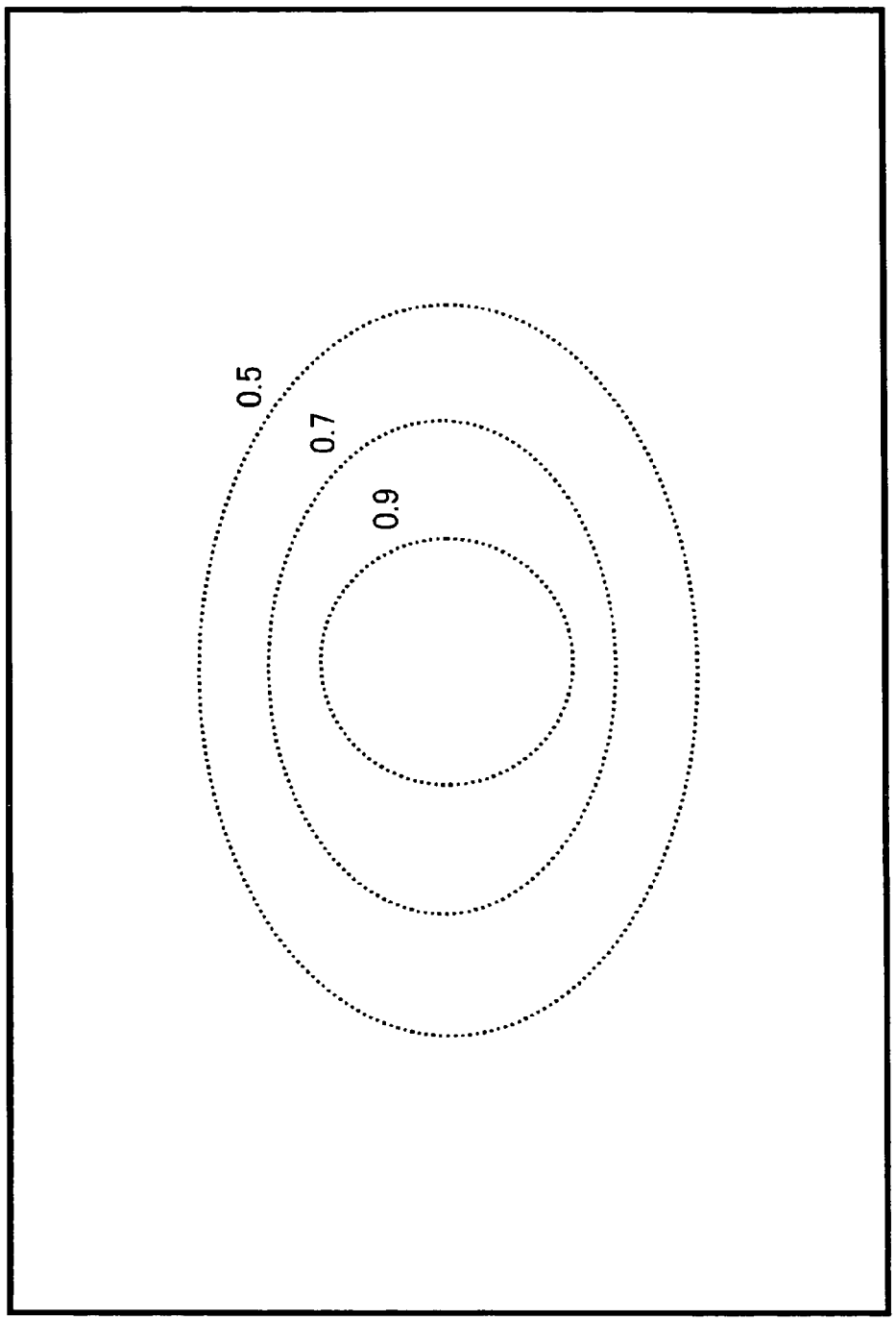
FIG. 14 is a schematic diagram showing the standard attention area information according to the second embodiment of the present invention.

On the other hand, in the case the recognizable face area is not present in the image data, it proceeds to the step S606 so that the standard attention area information having the distribution with the center of the image as the attention point is set as shown in FIG. 14. Thereafter, it proceeds to the step S607 so that the accumulation area table of the probability distribution is produced. Thereafter, it proceeds to the step S608 so as to add 1 to the counter N. Then, in the step S609, the process from the step S602 to the step S607 is executed repeatedly until the counter N reaches at the image total number.

(Parameter Determining Control Process)

Figure 15:
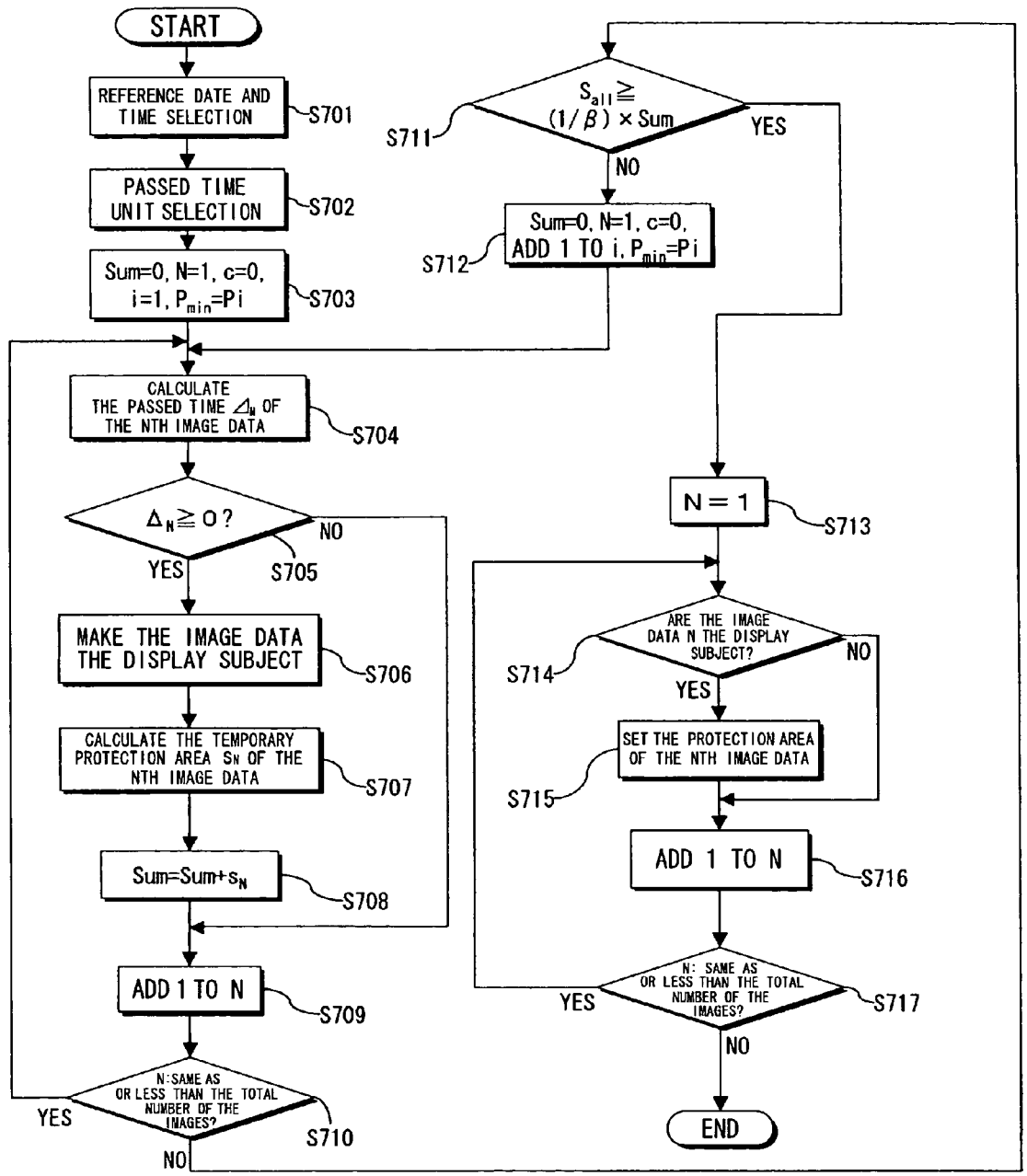
FIG. 15 is a flow chart for explaining the display control according to the second embodiment of the present invention.

Next, the control process for determining the parameter for controlling the portion of the protection area without being hidden under the other image data display areas while evaluating the attention areas of the image data to be the display subject according to the standard date and time by the display control section 401 will be explained. FIG. 15 shows the parameter determining control process.

That is, as shown in FIG. 15, first, in the step S701, the date and time to be the reference of the display control is set. Here, as in the case of the first embodiment, an example of the date and time with the latest date and time information selected out of the date and time information of the image data to be displayed as well as the standard date and time set according to the user operation, or the like will be presented.

Next, in the step S702, the time unit at the time of calculating the passed time from the standard date and time will be selected. Then, it proceeds to the step S703 so that the variable necessary for the display control is initialized.

Sum is the variable for calculating the calculating the total sum of the temporary protection area, N is the counter for successively dealing with the image data, c is the counter for the number of the pieces of the image data to be the display subject, $P_{min}$ is the parameter for the display control, and $P_i$ is the value of the predetermined parameter candidate.

Then, in the step S704, the photograph date and time information of the related information concerning the Nth image data and the standard date and time information are compared by the display control section 401. In the case the photograph date and time is prior to the reference date and time, the image data are the display subject. Then, it proceeds to the step S707 so that the temporary protection area $s_N$ of the image data is calculated.

That is, the function for evaluating the attention area according to the passed time $\Delta_N$ from the photograph date and time of the Nth image data to the standard date and time is defined as shown in FIG. 16A. The state of FIG. 16A can be represented by the formula 13.

$$\alpha_N = 1 - (1 - P_{min}) \exp(-k\Delta_N) \quad \text{(formula 13)}$$

$\alpha_N$ is for providing the probability to be the lower limit employed as the protection area in the probability distribution of the face area. By the parameter $p_i$ (=$P_1$, $P_2$, ...) provided to the $P_{min}$, the evaluation degree can be adjusted. Here, according to the process procedure shown in FIG. 15, as to $P_{min}$, a relatively small value $P_1$ is provided initially so that the face area as the attention area is evaluated widely as the protection area. The temporary protection area $s_N$ is calculated as the area having $\alpha_N$ or more probability from the probability distribution applied to the image data. Moreover, simply, it can be calculated according to the accumulation area table (FIG. 13) prepared already.

Next, in the step S708, the calculated temporary protection area $s_N$ is added to the total sum Sum or the temporary protection area. Through the step S709 and the step S710, the total sum Sum of the temporary protection area for one parameter $P_i$ is calculated.

Thereafter, it proceeds to the step S711 so that the total sum Sum of the temporary protection area is compared with the display total area $S_{all}$ using the superimposition efficiency β. As a result of the comparison, in the case it is judged that the total sum Sum of the temporary protection area is not accommodated within the display total area $S_{all}$ in consideration to the superimposition efficiency, it proceeds to the step S712 so that the total sum Sum of the temporary protection area and counter N are initialized, and 1 is added to i for changing the value of $P_{min}$ to a new $P_i$ so as to evaluate the protection area again.

On the other hand, in the step S711, in the case it is judged that the total sum Sum of the temporary protection area is accommodated within the display total area $S_{all}$ in consideration to the superimposition efficiency β, $P_i$ at the time is adopted as the parameter $P_{min}$ value. Thereafter, in the step S713, after initializing the counter N, the protection area is set for the image data to be the display subject in the steps S714 to S717 as in the steps S414 to S416 in the first embodiment.

(Formula 14) is another example of the (formula 13) for providing the lower limit of the probability for adopting as the protection area with respect to the passed time $\Delta_N$, representing the change shown in FIG. 15B.

$$\alpha_N = 1 - P_{min} \times \exp(-k_i \Delta_N) \quad \text{(formula 14)}$$

In the case the (formula 14) is used, according to the procedure of FIG. 15, the area of the protection area can be adjusted without changing $k_i$ successively or changing the area of the protection area of the image data close to the reference date and time. As to the other process procedure, it can be operated similarly according to the first embodiment and the procedure mentioned above.

Next, based on the protection area evaluated and set according to the passed time $\Delta_N$ from the probability distribution of the attention area by the display control section 401, the display process for the image data is executed. The display process control is for displaying the image data of a plurality of pieces while efficiently arranging the same without superimposing the protection areas of the image data.

Therefore, in the area with the display areas of the image data superimposed at a position to have the outer rim of the protection area of the image data to be disposed newly on the outer rim of the display area of the image data disposed already contacted, it is disposed so as to be superimposed on the lower side (more rear side) of the image data disposed already as well as the position to have the increase of the display area by the new arrangement minimally is selected for the arrangement. In other words, the position to have the maximum superimposition area of the area other than the protection area out of the display area of the image data is retrieved for the arrangement.

That is, as in the case of the display control process according to the first embodiment, the position to have the minimum value of the distance from the center of the display area to the outer rim of the display area of the image data disposed already is selected as the arrangement candidate position so that the position capable of ensuring the display of the protection area around the position is retrieved and the total display area in the case of disposing the image data on the position is calculated. The position to have the smallest display area out of a plurality of the arrangement candidate positions is determined as the arrangement position. The procedure of the display process control is same as the procedure shown in FIG. 7.

Figure 17:
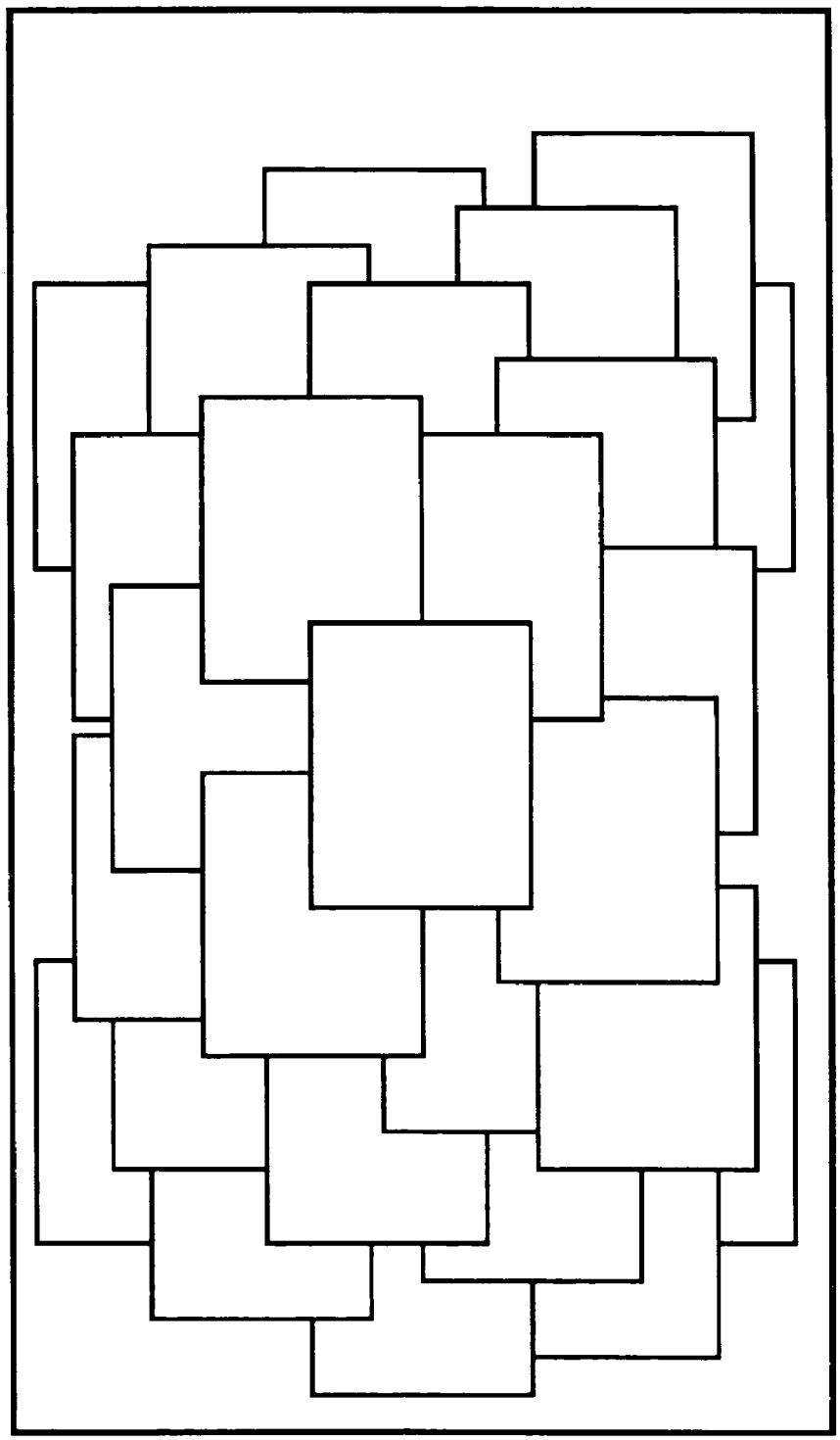
FIG. 17 is a schematic diagram showing the display state of the image data according to the second embodiment of the present invention.

As shown in FIG. 17, the state of the display of the image data disposed according to the display process control on the display screen is as in the case of the first embodiment, the image data to be disposed on the front side are displayed in the central part with those disposed on the outer side of the display area provided on the lower side (more rear side) for displaying the protection area.

Moreover, in general, according to the image data with a person photographed, as long as the image area capable of grasping the characteristics of the photographed person is shown, the content of the image data can be understood on the whole. Furthermore, even in the case it cannot be fully understood, it provides an important key in the retrieval operation. This denotes that the selection of the face area as the attention area of the image data of a personal photograph is extremely effective.

Then, according to the second embodiment, since the control is executed without hiding the protection area by superimposing a plurality of the image data with the attention area provided as the protection area at the time of displaying sections of the display ranges of the image data superimposed with each other for displaying a large amount of image data in a certain display area with the protection area determined based on the extraction probability distribution with the face area in the image data to be extracted by the image process as the characteristic area, a display capable of easily finding out a purposed image out of the image data displayed by a large amount can be provided.

Moreover, since the attention areas are evaluated according to the extraction probability of the face recognition at the time of evaluating the attention area of the older image data narrower according to the date and time information of the image data, the parts with a high probability representing the characteristics are displayed centrally, even in the case the number of pieces to be displayed is increased, the finding easiness can hardly be reduced, and thus it is advantageous.

Furthermore, according to the second embodiment, as in the case of the first embodiment, the familiar operation convenience close to the real operation of finding out a purposed photograph out of the real photographed piled by a large amount can be provided to the user by optionally changing the standard date and time by the operation element on the screen or another means.

Moreover, according to the second embodiment, although the example of the case of adopting the date and time information as the reference for evaluating the attention area has been explained, the evaluation reference is not always limited to the date and time information as long as it is based on the configuration of the present invention of determining the protection area by evaluating the attention area for controlling the display without superimposition of the area.

Specifically, for example, the evaluation can be carried out based on the similarity of the images. Moreover, also in this case, the images of a higher similarity suited for the purpose can be displayed conspicuously as long as the images of a lower priority out of the candidates for achieving the purpose can be displayed with the characteristic portions maintained in an area according to the necessity. Therefore, a practical list display of a larger number of pieces of image data to be viewed and found out easily can be realized.

As heretofore explained, although the embodiments of the present invention have been explained specifically, the present invention is not limited to the above-mentioned embodiments, and various modifications can be provided based on the technical idea of the present invention. For example, the numerical values presented in the above-mentioned embodiments are merely an example, and different numerical values can be used as needed.

This application claims priority from Japanese Patent Application No. 2004-6905 filed Jan. 14, 2004, which is hereby incorporated by reference, herein.

What is claimed is:

1. An image display controlling apparatus comprising:
   a memory means for storing an attention area information and a date and time information for each image data of a plurality of images to be displayed on an image display means,
   an evaluation means for evaluating the attention area information based on a standard date and time information and the date and time information and producing a protection area information for a protection area set within the attention area, and
   an adjusting means for listing and displaying the plurality of the images with a superimposition controlled based on the protection area information,
   wherein the plurality of the images are listed and displayed, and
   wherein the evaluation means is provided for comparing the standard date and time information and the date and time information for setting a smaller protection area of the image with a longer passed time of the date and time.

2. An image display controlling apparatus comprising:
   a memory means for storing an attention area information and a date and time information for each image data of a plurality of images to be displayed on an image display mean, an evaluation means for evaluating the attention area information based on a standard date and time information and the date and time information and producing a protection area information for a protection area set within the attention area, and an adjusting means for listing and displaying the plurality of the images with a superimposition controlled based on the protection area information, wherein the plurality of the images are listed and displayed, wherein the attention area information is the information having a distribution in attention degree, and the evaluation means is provided for setting the protection area of the image data with a longer passed time of the date and time information compared with the standard date and time information in an area with a high attention degree.

3. An image display controlling method comprising:

a step of storing attention area information and date and time information for each image data of a plurality of images, a step of evaluating the attention area information based on standard date and time information and on the date and time information, a step of producing protection area information for a protection area set within the attention area, and a step of listing and displaying the plurality of the images with the superimposition of the display of the plurality of the images controlled based on the protection area information, wherein the evaluating step is for comparing the standard date and time information and the date and time information for setting a smaller protection area of the image with a longer passed time of the date and time.

4. An image display controlling program for having a display controlling means for controlling an image display means execute:

a step of storing the attention area information and the date and time information for each image data of a plurality of images, a step of evaluating the attention area information based on the standard date and time information and the date and time information, a step of producing protection area information for a protection area set within the attention area, and a step of listing and displaying the plurality of the images with the superimposition of the display of the plurality of the images controlled based on the protection area information, wherein the evaluating step is for comparing the standard date and time information and the date and time information for setting a smaller protection area of the image with a longer passed time of the date and time.

5. An image display controlling method comprising:

a step of storing attention area information and date and time information for each image data of a plurality of images, a step of evaluating the attention area information based on the standard date and time information and the date and time information, a step of producing protection area information for a protection area set within the attention area, and a step of listing and displaying the plurality of the images with the superimposition of the display of the plurality of the images controlled based on the protection area information, wherein the attention area information is the information having a distribution in attention degree, and the evaluating step is provided for setting the protection area of the image data with a longer passed time of the date and time information compared with the standard date and time information in an area with a high attention degree.

6. An image display controlling program stored on a computer readable medium for controlling an image display means to execute:

a step of storing attention area information and date and time information for each image data of a plurality of images, a step of evaluating the attention area information based on standard date and time information and on the date and time information, a step of producing protection area information for a protection area set within the attention area, and a step of listing and displaying the plurality of the images with the superimposition of the display of the plurality of the images controlled based on the protection area information, wherein the attention area information is the information having a distribution in attention degree, and the evaluating step is provided for setting the protection area of the image data with a longer passed time of the date and time information compared with the standard date and time information in an area with a high attention degree.

* * * * *

UNITED STATES PATENT AND TRADEMARK OFFICE
CERTIFICATE OF CORRECTION

PATENT NO. : 7,239,347 B2
APPLICATION NO. : 11/036401
DATED : July 3, 2007
INVENTOR(S) : Takashi Yamamoto It is certified that error appears in the above-identified patent and that said Letters Patent is hereby corrected as shown below:

COLUMN 1

Line 16, "Relates" should read --Related--.
    Line 25, "in the case the user view" should read --in the case wherein the user views--.
    Line 51, "and thus" should be deleted.
    Line 54, "the photograph (a)" should read --wherein the photograph (a)--.
    Line 61, "in the case" should read --in the case wherein--.

COLUMN 2

Line 20, "are stored," should read --is stored,--.

COLUMN 3

Line 8, "find" should read --found--.

COLUMN 5

Line 1, "a image/sound" should read --an image/sound--.
    Line 36, "the image" should read --wherein the image--.
    Line 59, "comprises" should read --comprise--.

COLUMN 6

Line 66, "the case" should read --the case wherein--.

COLUMN 7

Line 3, "the case" should read --the case wherein--.
    Line 4, "shown in FIG. 2 is pressed" should read --(shown in FIG. 2)--.
    Line 17, "the case the" should read --the case wherein the--.
    Line 24, "contrary" should read --contrast--.
    Line 25, "the case the" should read --the case wherein the--.
    Line 29, "In the case the" should read --In the case wherein the--.
    Line 33, "case any" should read --case wherein any--.
    Line 43, "case the" should read --case wherein the--.
    Line 46, "case the" should read --case wherein the--.

UNITED STATES PATENT AND TRADEMARK OFFICE
CERTIFICATE OF CORRECTION

| | |
|---|---|
| PATENT NO. | : 7,239,347 B2 |
| APPLICATION NO. | : 11/036401 |
| DATED | : July 3, 2007 |
| INVENTOR(S) | : Takashi Yamamoto |

It is certified that error appears in the above-identified patent and that said Letters Patent is hereby corrected as shown below:

<u>COLUMN 8</u>

Line 18, "case the" should read --case wherein the--.
Line 20, "case it" should read --case wherein it--.
Line 22, "case the" should read --case wherein the--.
Line 31, "are evaluated" should read --is evaluated--.
Line 42, "case $\Delta_N$" should read --case wherein $\Delta_N$--.

<u>COLUMN 9</u>

Line 36, "case the" should read --case wherein the--.

<u>COLUMN 10</u>

Line 64, "case the" should read --case wherein the--.

<u>COLUMN 11</u>

Line 17, "with" should read --when--.
Line 33, "case the" should read --case wherein the--.
Line 36, "with" should read --when--.

<u>COLUMN 12</u>

Line 48, "the case" should read --the case wherein--.
Line 57, "the user" should read --wherein the user--.

<u>COLUMN 13</u>

Line 5, "recognizably" should read --recognizable--.
Line 50, "an" should be deleted.

<u>COLUMN 14</u>

Line 17, "same" should read --the same--.
Line 40, "case the" should read --case wherein the--.

UNITED STATES PATENT AND TRADEMARK OFFICE
CERTIFICATE OF CORRECTION

PATENT NO. : 7,239,347 B2
APPLICATION NO. : 11/036401
DATED : July 3, 2007
INVENTOR(S) : Takashi Yamamoto It is certified that error appears in the above-identified patent and that said Letters Patent is hereby corrected as shown below:

COLUMN 15

Line 7, "is mixed" should read --mixed--.
Line 28, "case the" should read --case wherein the--.
Line 38, "case" should read --case wherein--.

COLUMN 16

Line 1, "the calculating" should be deleted.
Line 10, "case" should read --case wherein--.
Line 42, "case" should read --case wherein--.
Line 50, "case" should read --case wherein--.
Line 65, "case" should read --case wherein--.

COLUMN 17

Line 36, "same" should read --the same--.
Line 49, "case" should read --case wherein--.

COLUMN 18

Line 4, "case" should read --case wherein--.
Line 67, "mean," should read --means,--.

Signed and Sealed this

Eighteenth Day of March, 2008

JON W. DUDAS
*Director of the United States Patent and Trademark Office*